US012179997B2

(12) United States Patent
Heaney

(10) Patent No.: US 12,179,997 B2
(45) Date of Patent: Dec. 31, 2024

(54) RECEPTACLE WITH EXPANDABLE CAVITY

(71) Applicant: Ronan Heaney, Glenview, IL (US)

(72) Inventor: Ronan Heaney, Glenview, IL (US)

( * ) Notice: Subject to any disclaimer, the term of this patent is extended or adjusted under 35 U.S.C. 154(b) by 31 days.

(21) Appl. No.: 17/349,518

(22) Filed: Jun. 16, 2021

(65) Prior Publication Data

US 2021/0395006 A1 Dec. 23, 2021

Related U.S. Application Data

(60) Provisional application No. 63/040,396, filed on Jun. 17, 2020.

(51) Int. Cl.
*B65F 1/02* (2006.01)
*B65F 1/16* (2006.01)

(52) U.S. Cl.
CPC ................ *B65F 1/02* (2013.01); *B65F 1/163* (2013.01); *B65F 1/1646* (2013.01)

(58) Field of Classification Search
CPC .......... B65F 1/02; B65F 1/163; B65F 1/1646; B65F 1/068; B65F 1/12; B65F 1/1426; B65F 2220/1066; B65F 1/14; B65D 21/00; B65D 21/08
USPC .......................... 220/4.22, 558, 908; 229/123
See application file for complete search history.

(56) References Cited

U.S. PATENT DOCUMENTS 139,653 A * 6/1873 Bentley .................. B42F 17/02 220/558
3,900,157 A * 8/1975 Roth .................... B65D 5/0005 229/101
5,381,921 A 1/1995 Bray et al.
5,836,470 A * 11/1998 Neelly ...................... B65F 1/06 220/908
5,890,615 A 4/1999 Petras
6,062,416 A 5/2000 Smillie
6,283,321 B1 9/2001 Beshorer
6,334,542 B1 * 1/2002 Hsu ....................... B65F 1/1638 220/826
D759,934 S 6/2016 Yang et al.
D771,344 S 11/2016 Yang et al.
D773,145 S 11/2016 Yang et al.
D793,642 S 8/2017 Yang et al.
9,809,239 B1 11/2017 Reiss et al.
(Continued)

FOREIGN PATENT DOCUMENTS

EP 3045408 A1 7/2016
ES 2319091 A2 5/2009

*Primary Examiner* — Don M Anderson
*Assistant Examiner* — Laura E. Parker
(74) *Attorney, Agent, or Firm* — Dykema Gossett PLLC

(57) ABSTRACT

Various receptacle embodiments with expandable cavities are disclosed. In some embodiments, a receptacle comprising a first and second frame with a hinge permitting the first frame to pivot about the axis defined by the hinge to expand the volume of the cavity defined by the first and second frame is disclosed. In another embodiment, a receptacle comprising a first and second frame comprising a tension gear mated into a corresponding track is disclosed, permitting lateral movement between the first and second frames to expand the volume of the cavity defined by the first and second frame is disclosed. Other disclosed embodiments comprise lid and foot pedal assemblies as well as spring assist systems and other features.

7 Claims, 33 Drawing Sheets

(56) References Cited

U.S. PATENT DOCUMENTS

| | | | | |
|---|---|---|---|---|
| D835,374 | S | 12/2018 | Yang et al. | |
| 2003/0080131 | A1* | 5/2003 | Fukuo | E05F 1/1058 220/264 |
| 2006/0261143 | A1 | 11/2006 | Sola Barbarin et al. | |
| 2008/0116207 | A1* | 5/2008 | Yang | B65F 1/163 220/495.11 |
| 2016/0194150 | A1* | 7/2016 | Romano | B65F 1/062 220/4.01 |
| 2018/0162637 | A1 | 6/2018 | Krietzman | |

* cited by examiner

RECEPTACLE WITH EXPANDABLE CAVITY

CROSS-REFERENCE TO RELATED APPLICATIONS

This application claims priority to U.S. provisional patent application No. 63/040,396 (the '396 application), filed Jun. 17, 2020. The '396 application is hereby incorporated by reference as though fully set forth herein.

BACKGROUND a. Technical Field

The instant disclosure relates generally to improvements to receptacles.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Fixed volume receptacles have been utilized in the art for a variety of applications, including for temporary and permanent storage of items. However, whether the application is for storing items for safe-keeping (for example, toys, household goods or equipment) or for temporary storage until disposal (for example, waste or garbage), the storage cavity and the surface area of the opening of a fixed volume receptacle is static. If a fixed volume receptacle is overfilled with items, many of the items that were easily placed in the receptacle before it became overfilled can no longer be removed as easily. Therefore, a user may experience substantial difficulty in removing those items without causing damage to the receptacle, the items themselves, or without ripping or tearing of any liner that is being used with the receptacle.

An example of problems with fixed volume receptacles can be found in many users' homes and offices. Home or office refuse fixed volume receptacles are commonly used in combination with disposable, single opening liners that are inserted into the fixed volume receptacles. When the liner is filled with refuse, it is removed for disposal and a fresh liner is inserted in its place. The removal of a full liner from a fixed volume receptacle presents a number of complications. For example, if the liner has been over-filled, the deposited refuse may spill out of the liner when the user attempts to remove the liner from the mouth of the fixed volume receptacle. Due to the force of the items pressing the liner against the side of the receptacle, the liner may catch and tear on protrusions within the fixed volume receptacle or on the lip of the opening of the receptacle. This is not only unsanitary, but it also creates an additional clean-up step for the user.

In another example, clothes over-filled in a fixed volume receptacle may be difficult to remove due to the clothing items catching and tearing on protrusions within the receptacle or on the lip of the opening of the receptacle.

In a further example, fixed-shaped objects, such as office equipment, that are stored in an over-filled fixed volume receptacle may be damaged as the user attempts to forcefully remove such items from the opening of the receptacle.

The design of prior-art fixed volume receptacles necessitates this result. Fixed volume receptacles are rigidly fixed into a single geometric shape. In the example of a garbage can, when the user removes the lip of the liner from the receptacle in order to fasten the liner close or remove the liner, the interior volume of the liner naturally decreases. Because the liner may have been filled to capacity when there was a larger interior volume, the sudden reduction in volume forces garbage out of the liner.

Further, even if a liner is not used (i.e., the items are free-stored in the fixed volume receptacle), most of the items would have been placed into the receptacle when the receptacle was not full, but now must be removed with many other items through the same-sized opening. This can lead to damage of both the items and the receptacle itself.

Therefore, it is desirous in the art to create a receptacle that has a cavity that is able to increase in volume (including by expanding the surface area of the opening of the receptacle), even after being over-filled, in order to safely and efficiently remove items stored in the receptacle.

The foregoing discussion is intended only to illustrate the present field and should not be taken as a disavowal of claim scope.

SUMMARY

In some embodiments, a receptacle comprises a first frame and a second frame adjoining the first frame to define a cavity with a first volume. The embodiment may further comprise a hinge, defining a first axis and operatively attached to the first frame, wherein the first frame may pivot about the first axis in order to redefine the cavity with a second volume. The embodiment may further comprise a lid assembly, wherein the lid assembly abuts the cavity with the first volume and covers an aperture defined by the cavity with the first volume. The lid assembly may further comprise an outer lid, an inner lid seated within the outer lid, and a lid hinge defining a second axis and operatively attached to the outer and inner lid, wherein each of the outer lid and the inner lid may pivot about the second axis defined by the lid hinge independently of each other. An embodiment may further comprise a foot pedal assembly comprising a foot pedal member and a pivot rod defining a third axis disposed within the foot pedal assembly between the foot pedal member and a push rod operatively abutted to the foot pedal member and the lid assembly. The embodiment may further comprise a stop, wherein the stop is mated with a stop aperture disposed within the second frame. The embodiment may further comprise a spring connecting the first frame to the second frame and that is configured to resist the first frame's pivot about the first axis.

In other embodiments, a receptacle comprises a first frame, a second frame adjoining the first frame defining a cavity with a first volume, and a member disposed on the second frame mated with a track on the first frame, wherein the member and the track are configured to permit lateral movement between the first frame and the second frame in order to redefine the cavity with a second volume. In an embodiment, the member may be a gear comprising a plurality of teeth and the track may comprise a plurality of apertures configured to mate with the plurality of teeth of the member. The embodiment may further comprise a lid assembly, wherein the lid assembly abuts the cavity with the first volume and covers an aperture defined by the cavity with the first volume and may also comprise an outer lid, an inner lid seated within the outer lid, and a lid hinge defining a first axis and operatively attached to the outer and inner lid, wherein each of the outer lid and the inner lid may pivot about the first axis independently of each other. An embodiment may further comprise a foot pedal assembly comprising foot pedal member and a pivot rod defining a second axis disposed within the foot pedal assembly between the foot pedal member and a push rod operatively abutted to the foot pedal member and the lid assembly. An embodiment may further comprise a stop wherein the stop is mated with a stop aperture disposed within the second frame. An embodiment may further comprise a spring connecting the first frame to the second frame configured to resist the lateral movement between the first frame and the second frame.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
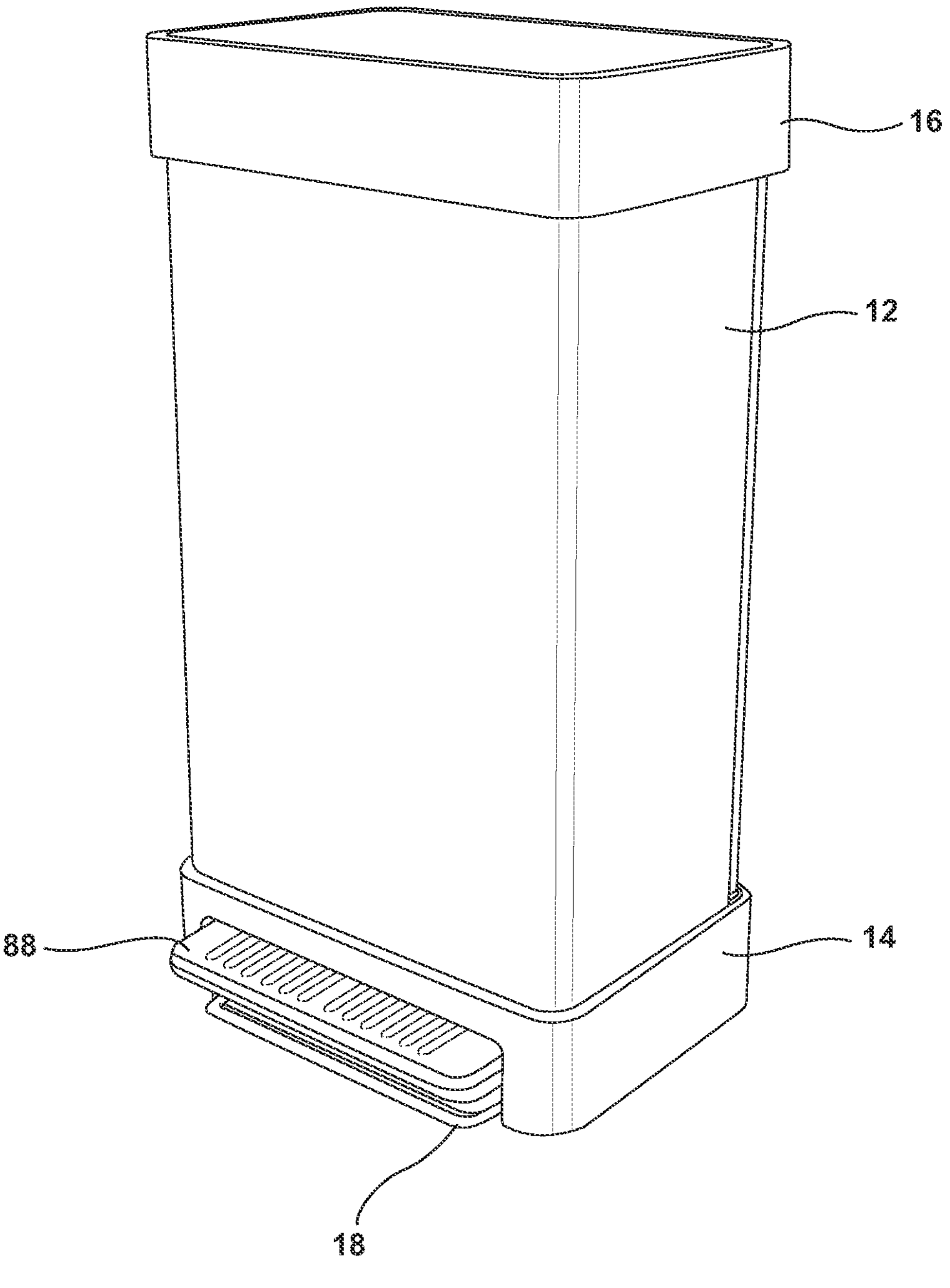
FIG. 1 is a view of the receptacle structure, in an embodiment.

As demonstrated in FIG. 1, a receptacle structure in an embodiment comprises an outer frame 12, seated in a base assembly 14 and topped by a lid assembly 16. Within the base assembly 14 is a foot pedal assembly 18, comprising a tread 88. The foot pedal assembly 18 is positioned within base assembly 14 with upper and lower clearances sufficient to allow a user to operate the tread 88. The structure and operation of the foot pedal assembly 18 is described in additional detail in FIG. 19.

Figure 2:
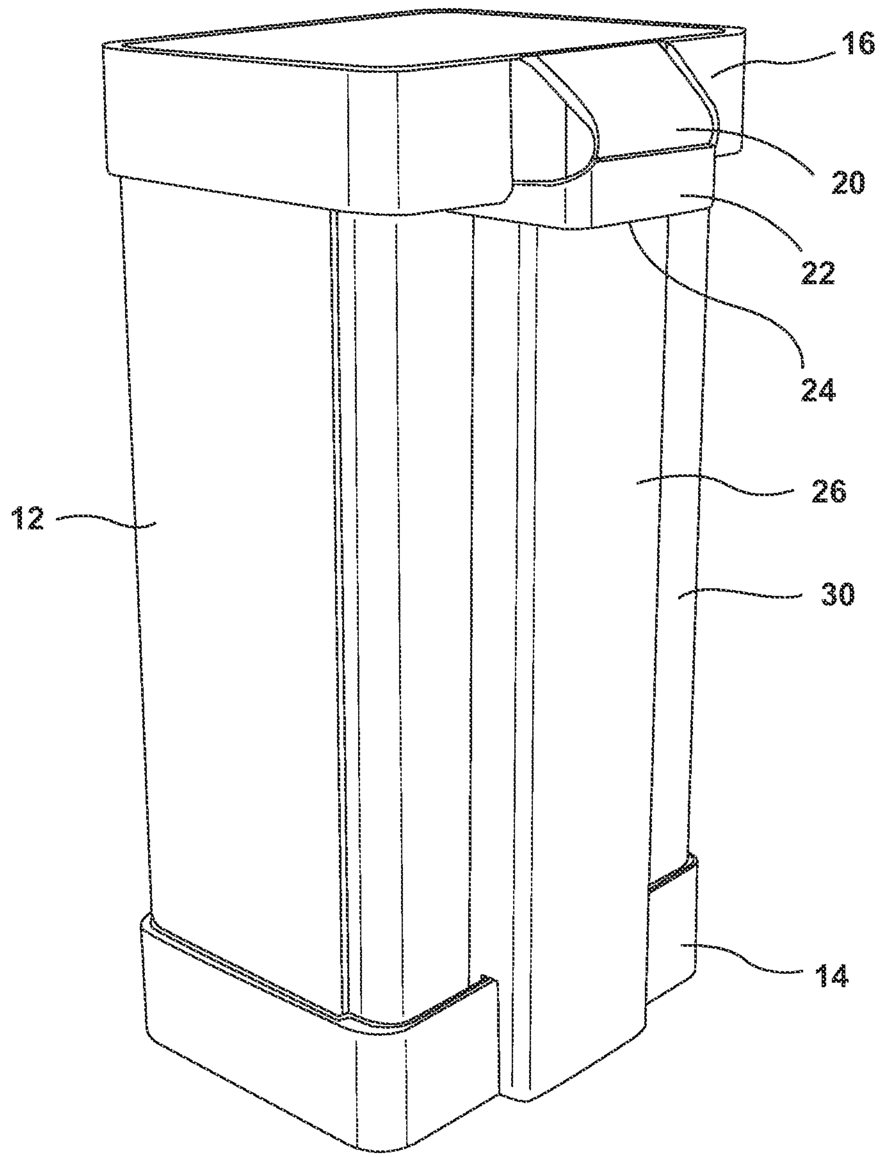
FIG. 2 is an angled alternative view of the receptacle structure, in an embodiment.

Referring now to FIG. 2, the lid assembly 16 is operated by a lid hinge 20. Lid hinge 20 is seated within grip 22, wherein the grip 22 contains a grip aperture 24 that functions as a location for a user to grab carry the receptacle structure. The grip 22 is secured to the inner frame 30 by a vertical member 28, which is concealed in FIG. 2 by a back cover 26.

Figure 3:
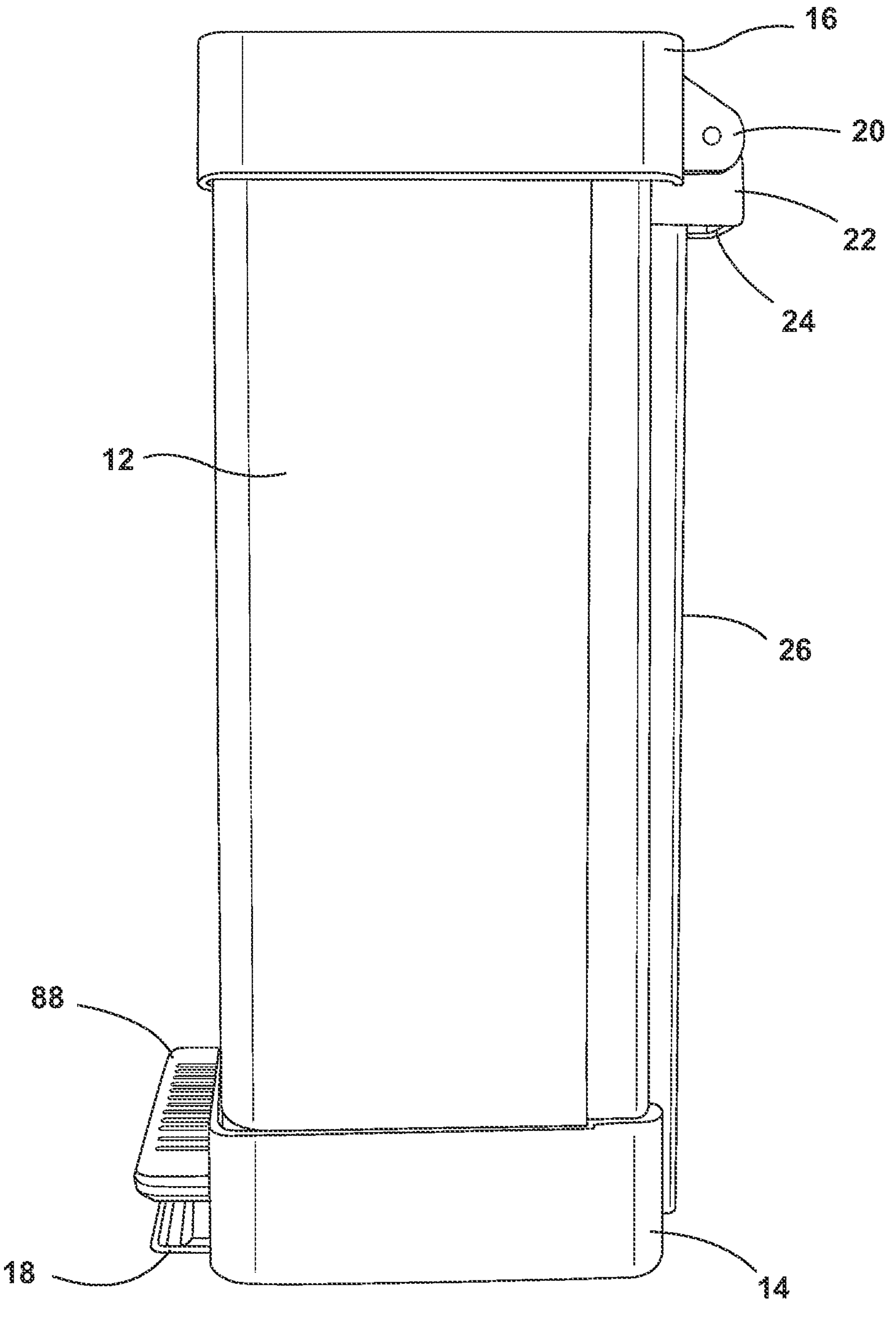
FIG. 3 is a side view of the receptacle structure, in an embodiment.

FIG. 3 depicts the embodiment of the receptacle structure from a different angle. As shown, the foot pedal assembly 18 is seated within the base assembly 14, which also receives the back cover 26 at a point distal from the foot pedal assembly 18.

Figure 4:
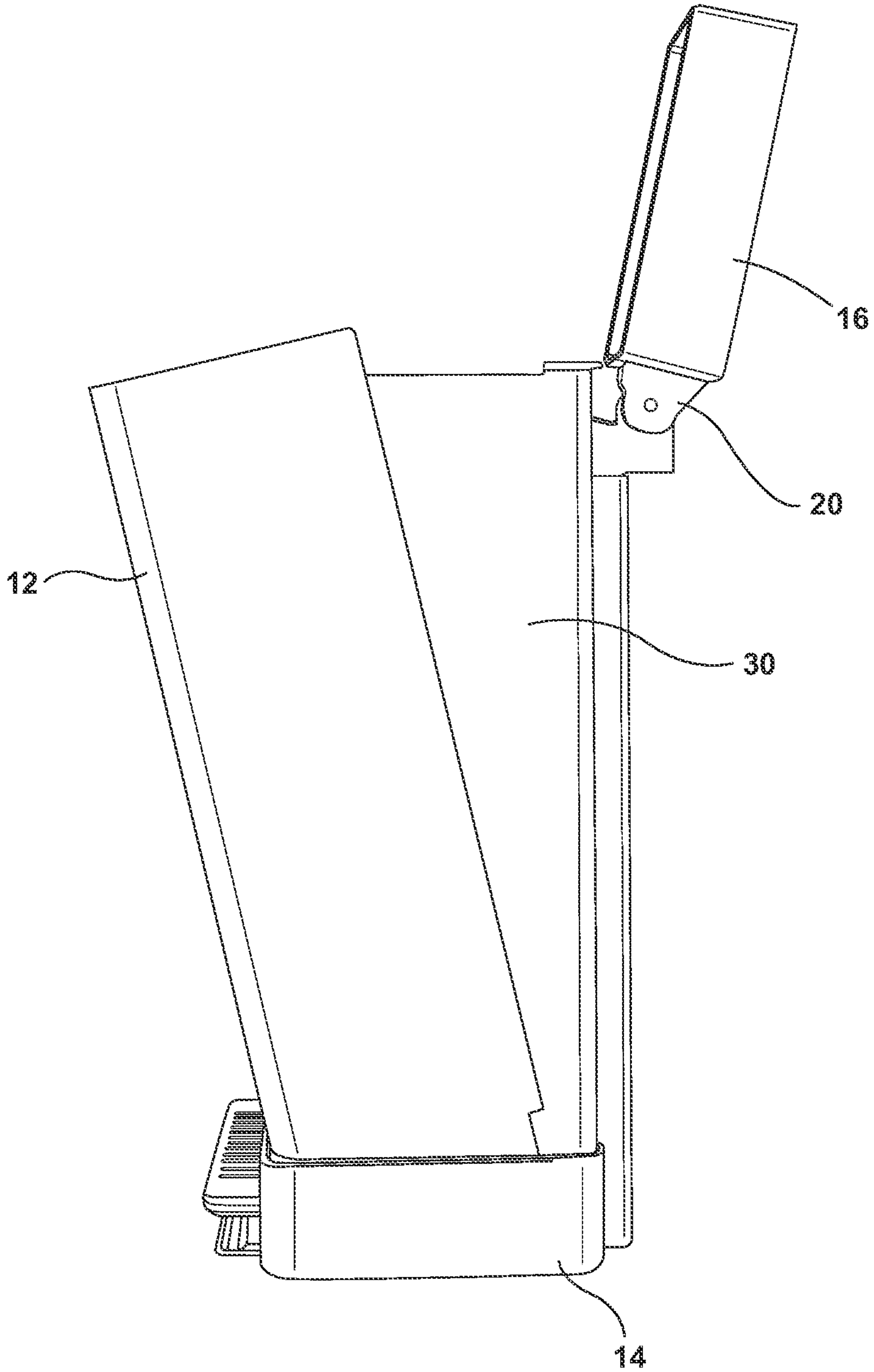
FIG. 4 is a view of the receptacle structure while in its expanded state, in an embodiment.

The receptacle structure is shown in its expanded state in FIG. 4. As shown in FIG. 4, the lid assembly 16 is rotated about the lid hinge 20 and is resting in a near-perpendicular position relative to inner frame 30. Outer frame 12 is tilted forward about a base hinge 44 (not shown in FIG. 4, described further herein) to show a stationary inner frame 30. As detailed in FIG. 4, the inner frame 30 is seated within base assembly 14 and fixed to the lid hinge 20.

Figure 5:
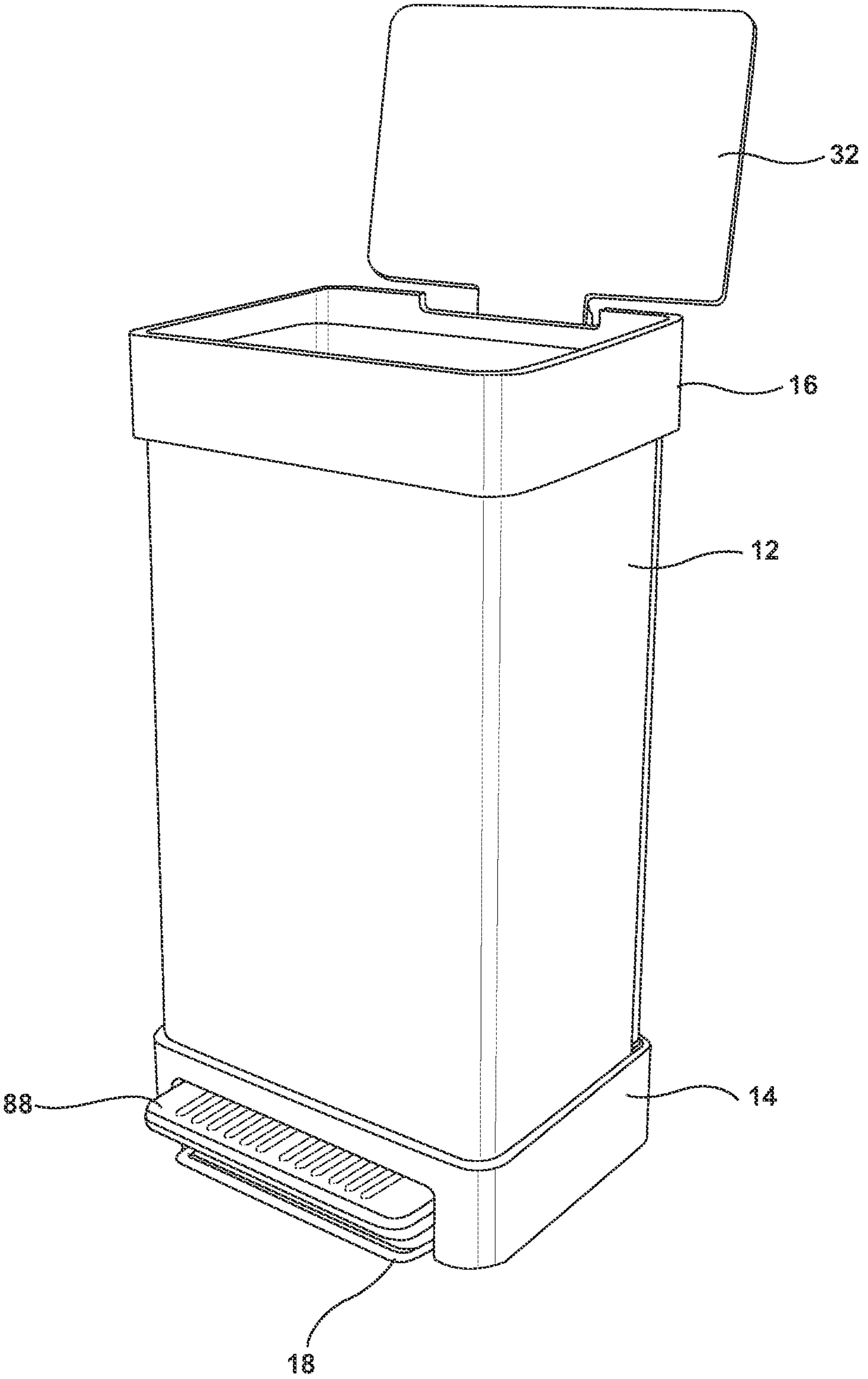
FIG. 5 is a view of the receptacle structure while the inner lid is open, in an embodiment.

FIG. 5 provides an alternative view of the receptacle structure in its collapsed state. In this embodiment, the inner lid 32 is lifted while the remainder of the lid assembly 16 remains seated on the structure formed by the mated outer frame 12 and inner frame 30. In this embodiment, and as described further herein, the inner lid 32 pivots about the lid hinge 20 independently of the lid assembly 16, which also pivots about lid hinge 20.

Figure 6:
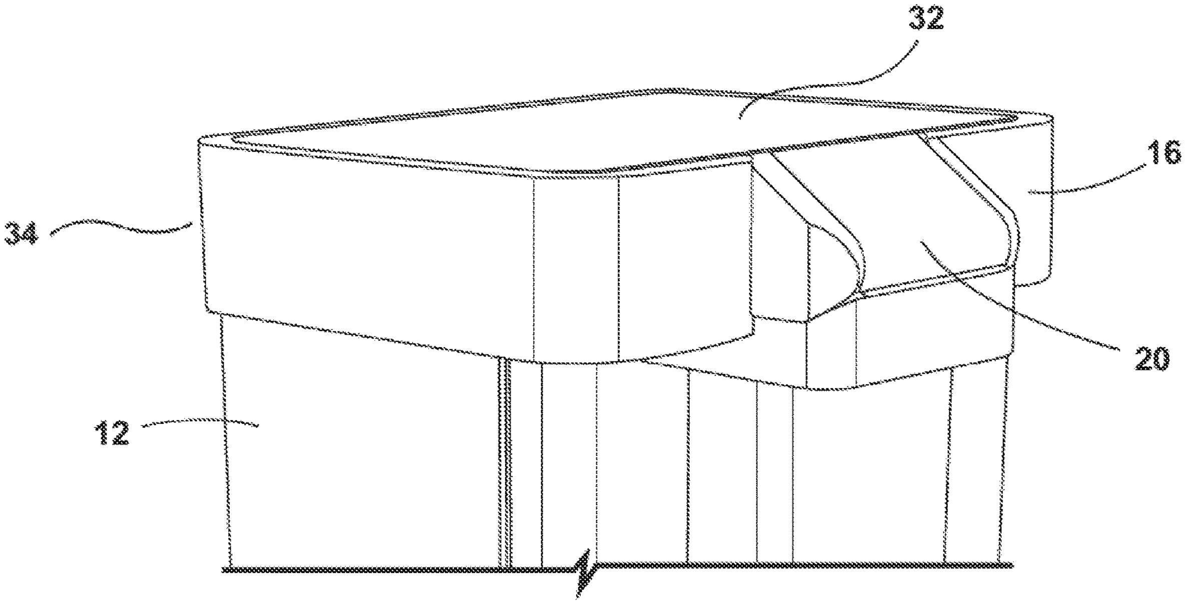
FIG. 6 is an angled view of the back of the receptacle structure's lid.
Figure 7:
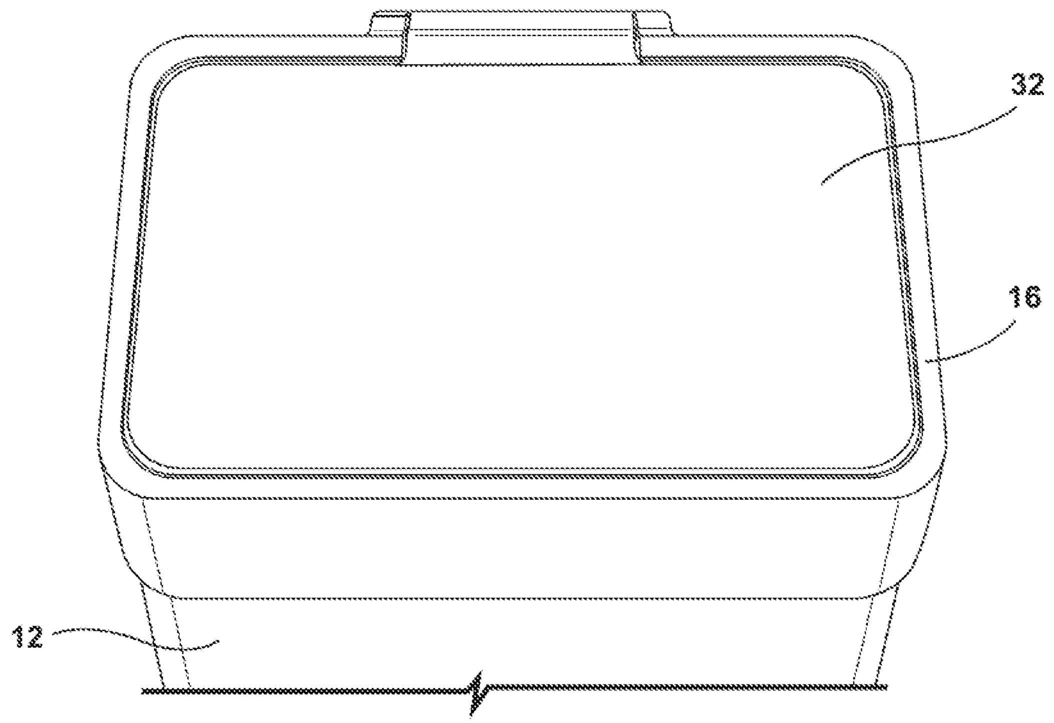
FIG. 7 is a top-down view of the receptacle structure, in an embodiment

FIGS. 6 and 7 provide alternative views of the lid assembly 16 while the lid assembly is in a collapsed state. As shown, the inner lid 32 is seated within a main lid 34 to form the lid assembly 16. The lid assembly pivots about the lid hinge 20.

Figure 8:
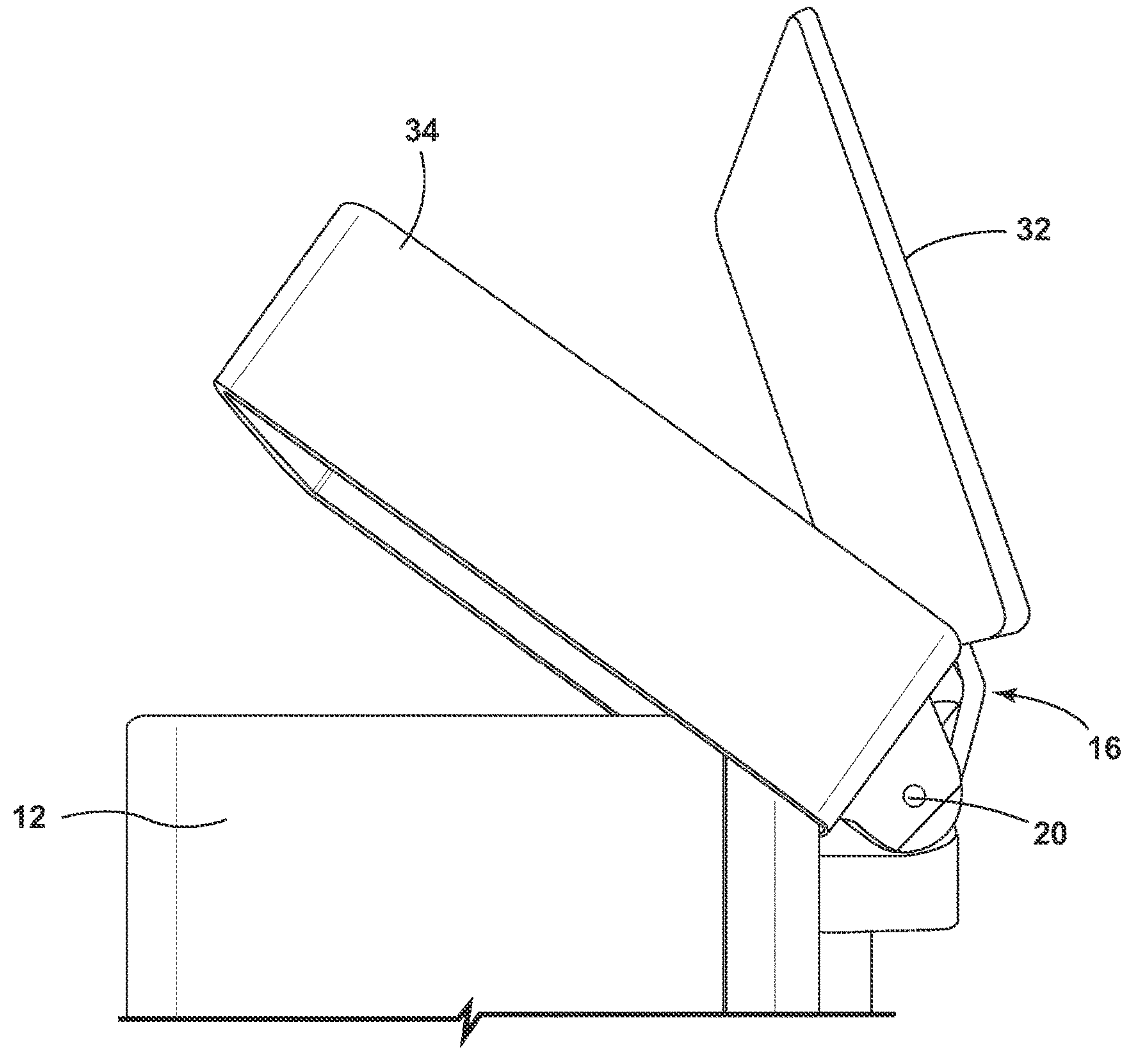
FIG. 8 is a view of the lid assembly, wherein the main lid and the inner lid are opened to different angles with respect to the main body of the receptacle, in an embodiment.
Figure 9:
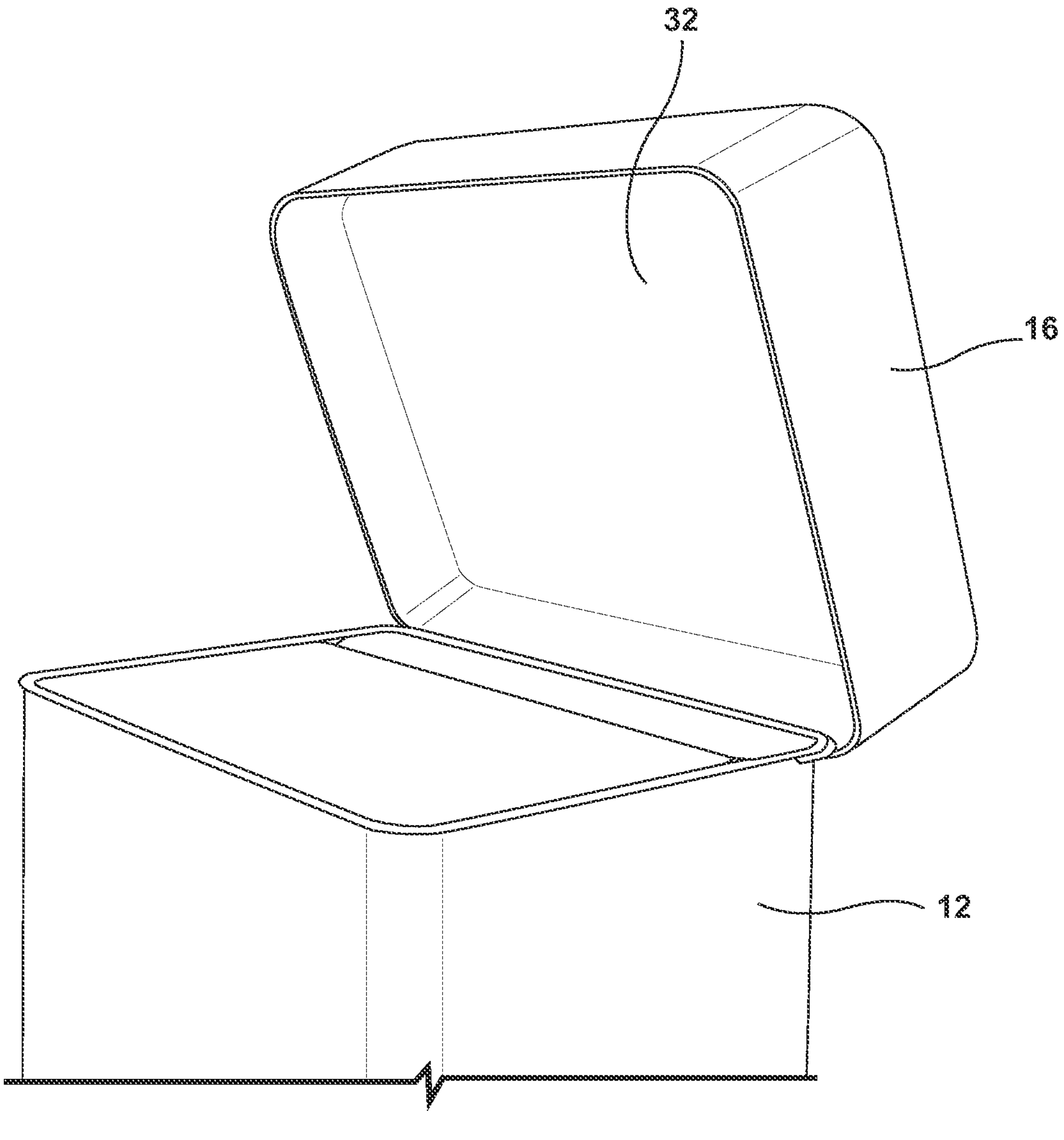
FIG. 9 is a view of the receptacle structure, wherein the entire lid assembly is an opened state, in an embodiment.

As shown in further detail in FIG. 8, the lid assembly 16 comprises of the main lid 34 and the inner lid 32. The lid assembly 16, pivoting about lid hinge 20, may move from a horizontal position atop the structure formed by the mated outer frame 12 and inner frame 30 (not shown in FIG. 8) to a near perpendicular position, while the inner lid 32 may pivot independently of main lid 34. As further detailed in FIG. 9, the lid assembly 16 may pivot about the lid hinge 20.

Figure 10:
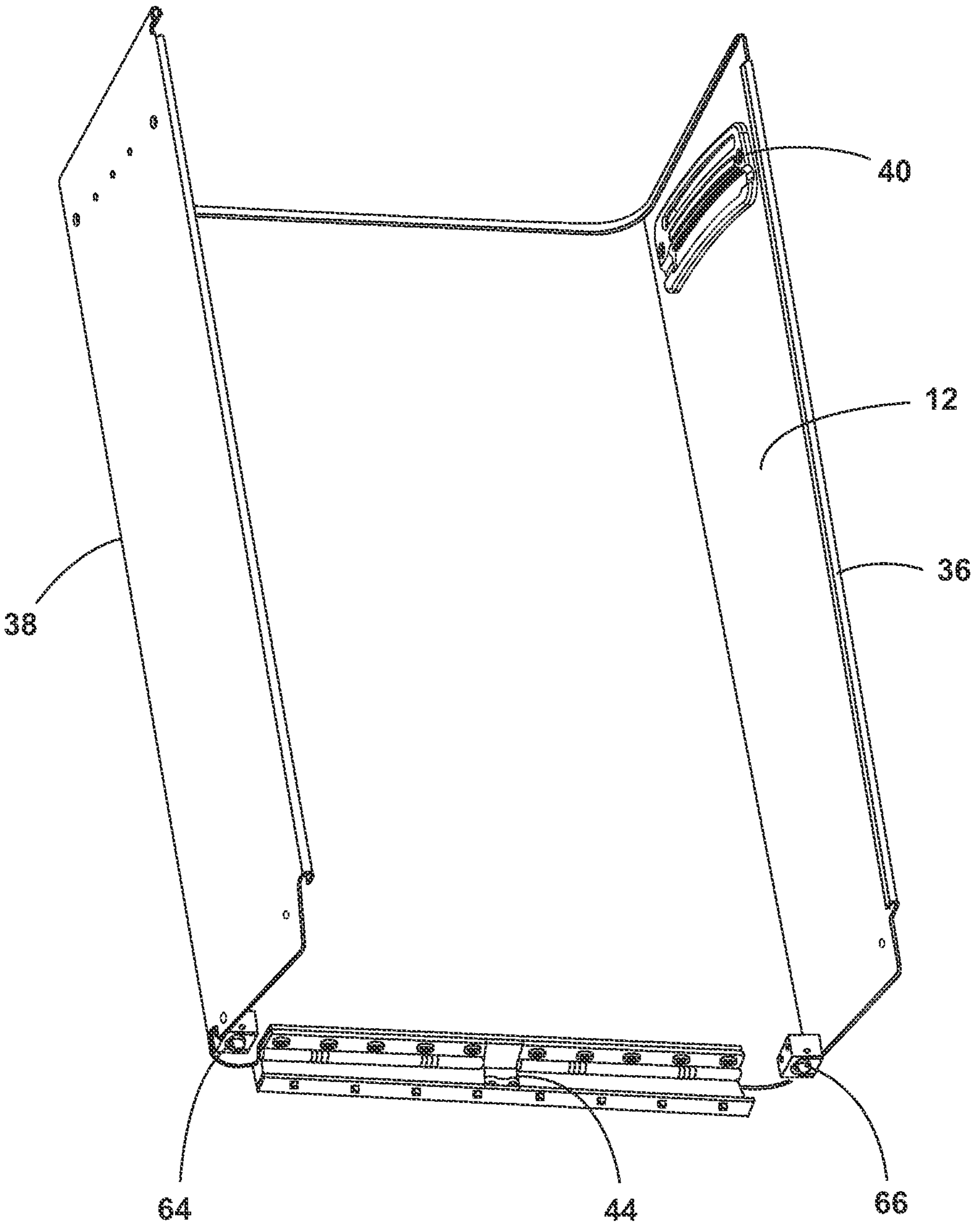
FIG. 10 is a detailed view of the outer frame, in an embodiment.
Figure 14:
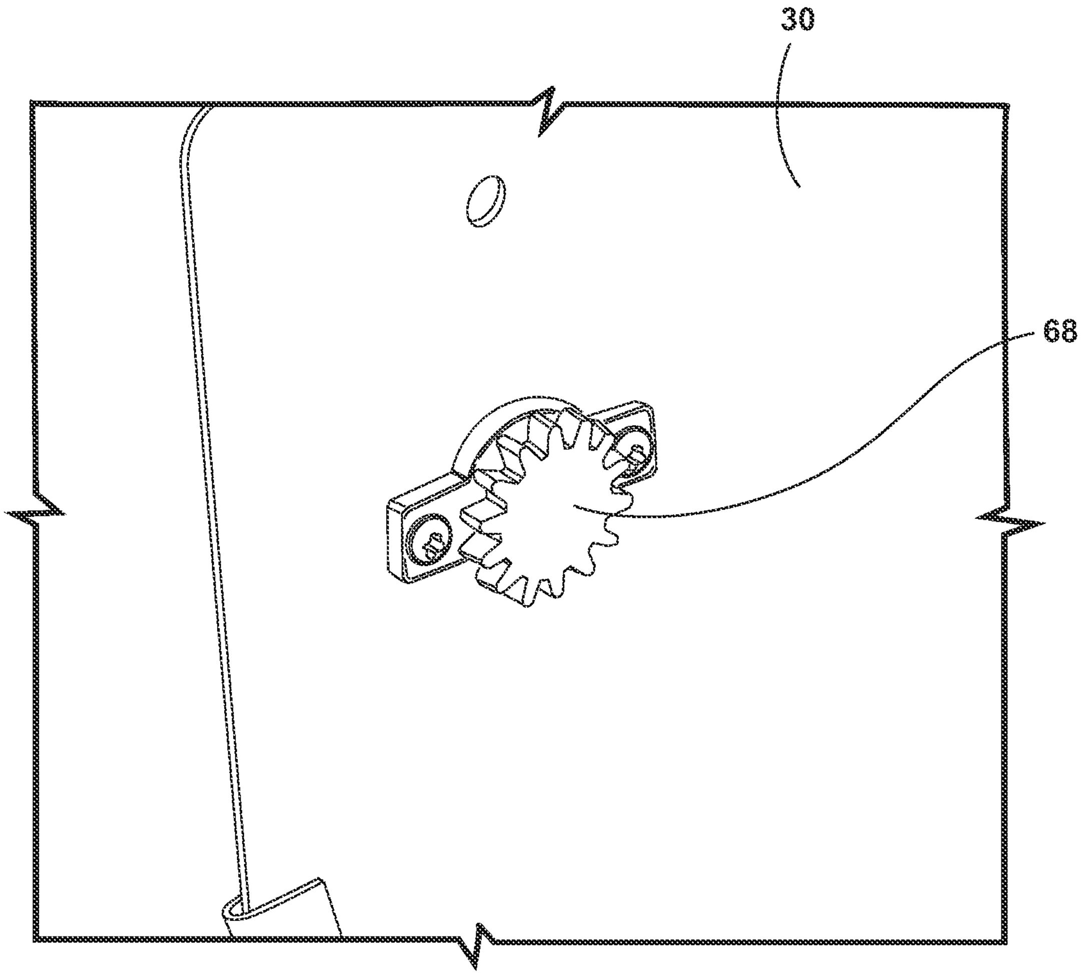
FIG. 14 is a detailed view of the first gear, in an embodiment.
Figure 15:
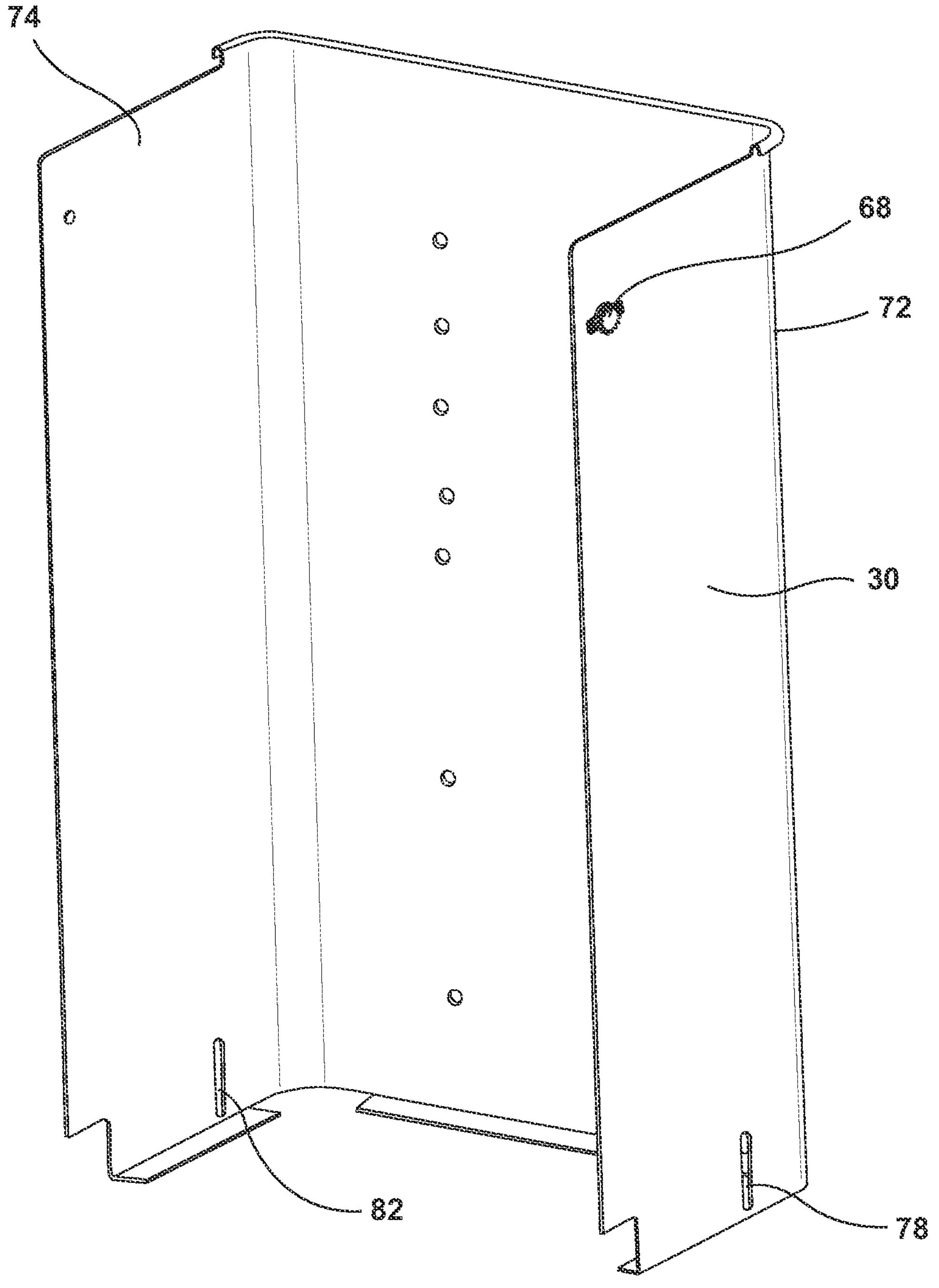
FIG. 15 is a view of the inner frame showing the position of the first gear, in an embodiment.

In FIG. 10, the interior face of the outer frame 12 comprises a first fixed track 40 and a second fixed track 42 (not shown in FIG. 10), wherein the first fixed track 40 is designed to operatively mate with a corresponding first gear 68 (as shown in FIG. 14), which is fixed to the outer face of inner frame 30 (as shown in FIG. 15). In this embodiment, the first fixed track 40 is positioned on the interior face of a first outer wing 36 of the outer frame 12, while the second fixed track 42 is fixed on the interior of a second outer wing 38 of the outer frame 12 (not shown in FIG. 10), so that when so positioned, the first fixed track 40 and the second fixed track 42 are at mirrored positions and face each other on opposite sides of the outer frame 12.

As further shown in FIG. 10, a base hinge 44 operatively connects the outer frame 12 to the base assembly 14, wherein the base hinge 44 permits the outer frame 12 to pivot about a horizontal axis in parallel with or composed on the horizontal plane formed by the base assembly 14. The base hinge 44 is further described in FIG. 13.

In an embodiment, the outer frame 12 comprises a first assist spring 64 and a second assist spring 66, further connecting the base assembly 14 and the outer frame 12.

Figure 11:
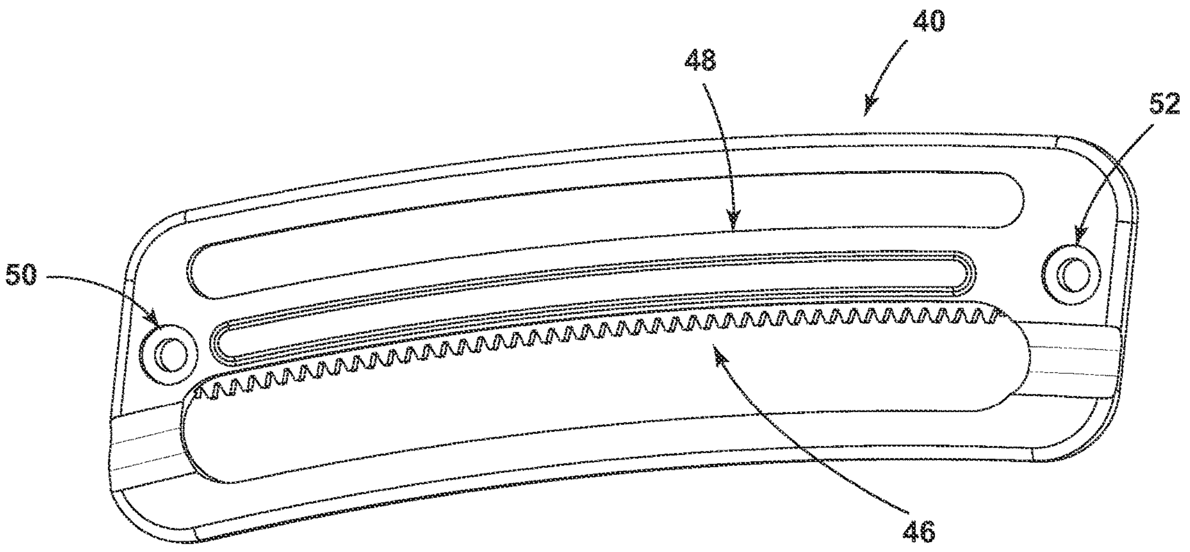
FIG. 11 is a detailed view of the first fixed tack, in an embodiment.
Figure 12:
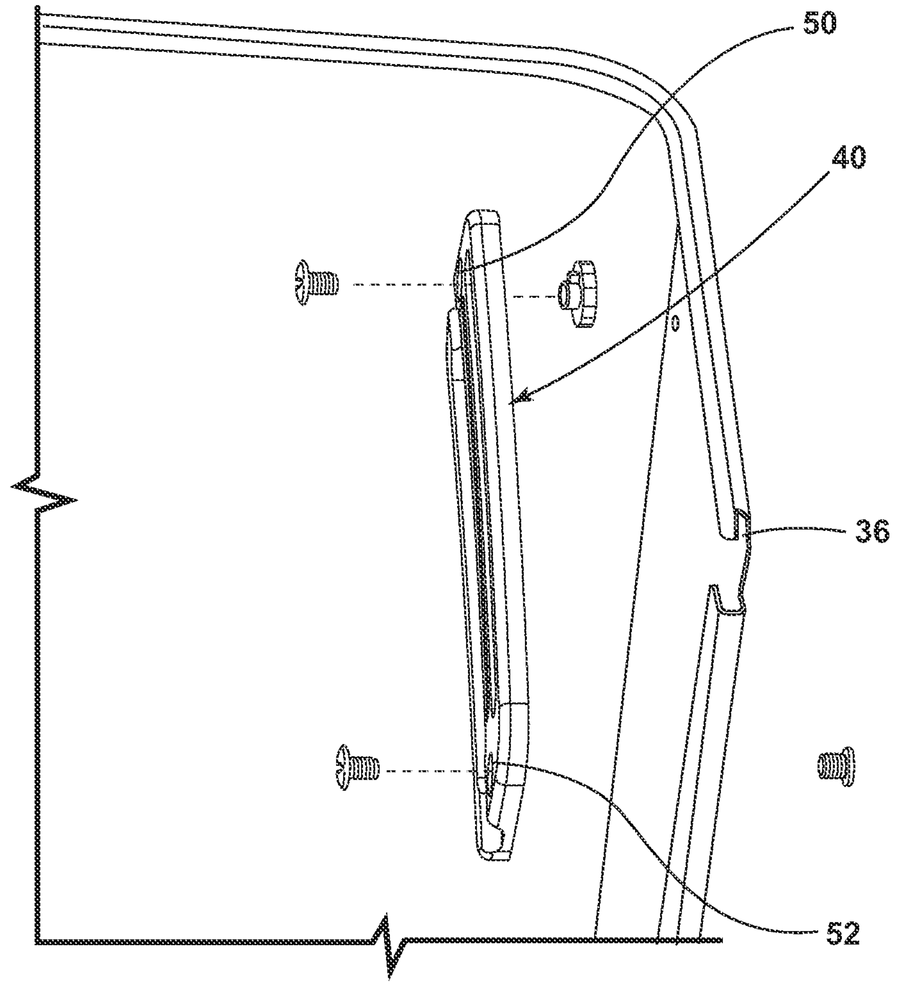
FIG. 12 is a detailed view of the how the first fixed track is secured to the outer frame, in an embodiment.

An embodiment of the first fixed track 40 is shown in additional detail in FIG. 11. In this embodiment, the first fixed track 40 comprises at least a first track opening 46, wherein the first track opening 46 further comprises a first set of teeth 48 configured to mate with the spokes of first gear 68 (not shown in FIG. 11). In this embodiment, the first fixed track 40 further comprises a first fixing hole 50 and a second fixing hole 52, both configured to receive screws or other fixing means to fix the first fixed track 40 to the first outer wing 36 (as shown in FIG. 12). However, as known to a person of ordinary skill in the art, the first fixed track 40 may employ a variety of holes, fixing means and track configurations designed to mate with a corresponding gear, depending on the specific application and need. Further, an embodiment consistent with this disclosure may employ one or multiple track and gear combinations, as dictated by application. Additional track and gear combinations may be utilized consistent with this disclosure that mirror the configuration of first fixed track 40, so as to be utilized on an opposite face or wing of outer frame 12.

Figure 13:
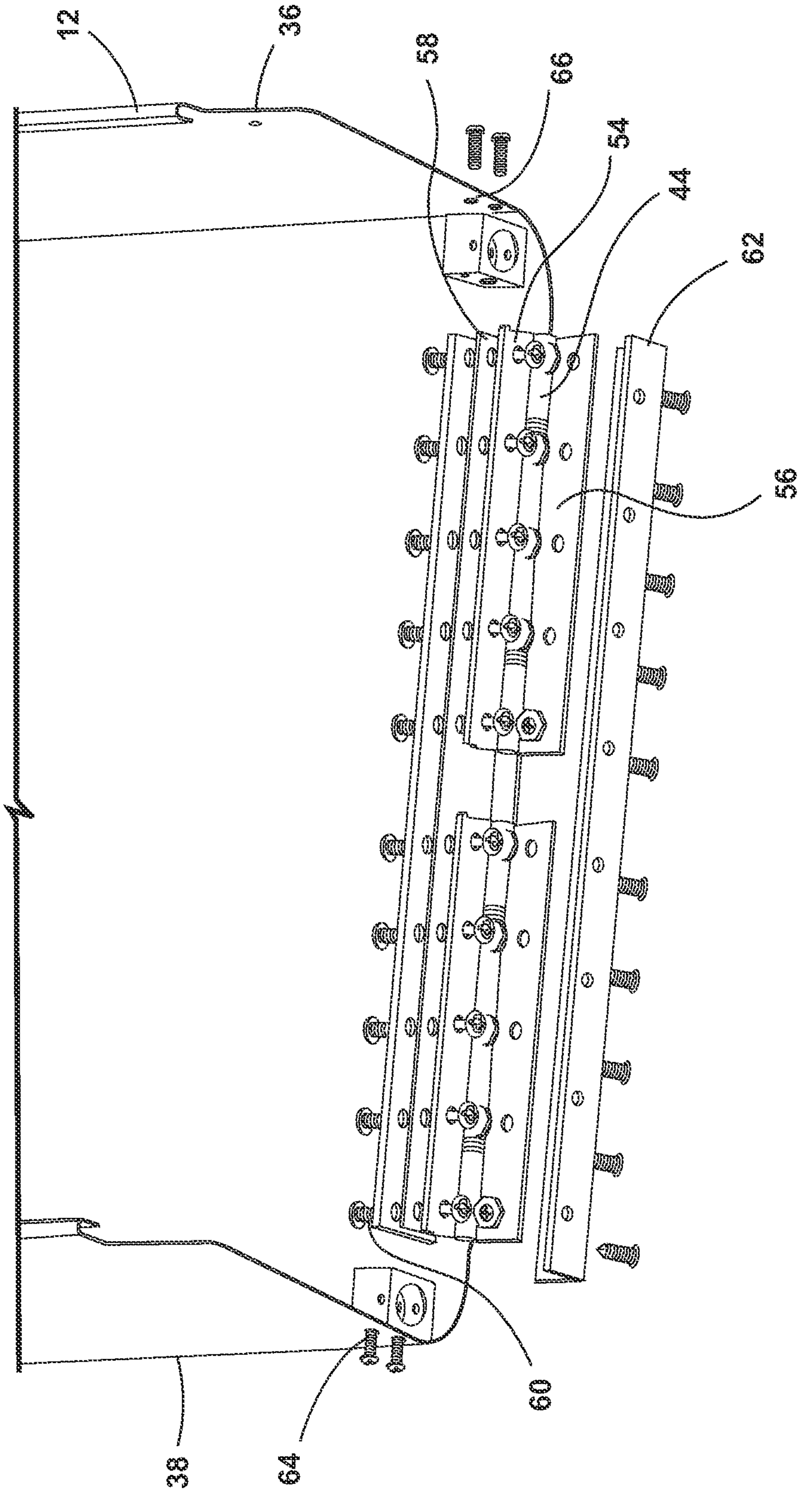
FIG. 13 is a detailed view of the base hinge, in an embodiment.

An embodiment of the base hinge 44 is shown in additional detail in FIG. 13. The base hinge 44 operatively connects the outer frame 12 to the base assembly 14 and allows the outer frame 12 to pivot about the base hinge 44 along a horizontal axis parallel to the horizontal plane formed by the base assembly 14. In this embodiment, a movable portion 54 of the base hinge 44 is fixed to the outer frame 12 through a hinge mount 58, which is part of the outer frame 12. The base hinge 44 is fixed to the hinge mount 58 through screws or other fixing means. In a further embodiment, a mount plate 60 may be fixed to the hinge mount 58 on the face opposite of the base hinge 44 in order to further secure the hinge mount 58 and base hinge 44 together. A stationary portion 56 of the base hinge 44 is fixed to a hinge bracket 62, which in turn may be fixed to the base assembly 14 (not shown in FIG. 13) through screws or other fixing means.

In the embodiment depicted in FIG. 13, the first assist spring 64 and the second assist spring 66 are fixed to the lower parts of the first outer wing 36 and the second outer wing 38 respectively. In an embodiment, the first assist spring 64 and the second assist spring 66 influence the outer frame 12 towards a vertical position that is perpendicular or nearly perpendicular to the horizontal plane formed by the base assembly 14. However, as known to a person of ordinary skill in the art, the spring assists could be placed on other locations on outer frame 12 to influence the outer frame 12 toward a vertical position, depending on the specific application and need.

FIG. 14 depicts the inner frame 30 in greater detail. In this embodiment, a first gear 68 is mounted to the exterior of the inner frame 30 on the first inner wing 72 (shown in FIG. 15) at a position corresponding to the location of first fixed track 40 on the outer frame 12, such that they would mate when the receptacle is in its collapsed state. While not shown in FIG. 14, a second gear 70 is mounted to the exterior of the second inner wing 74 of the inner frame 30 at a position corresponding to the second fixed track 42 on the outer frame 12 (see FIG. 31). In an embodiment, first gear 68 is shown comprising spokes that operatively mate with the teeth of the first fixed track 40, so that when so mated, outer frame 12 and inner frame 30 may be mated together in a relationship that permits outer frame 12 and inner frame 30 to move laterally in relationship to each other while still being securely mounted to each other. In an embodiment, second gear 70 may be mated with second fixed track 42 to further permit such a relationship between outer frame 12 and inner frame 30. However, as would be known to a person of ordinary skill in the art, an embodiment consistent with this disclosure may comprise gear and track combinations or other securing means not explicitly shown in FIG. 14 that permits outer frame 12 and inner frame 30 to move laterally in relation to each other while still being securely mounted to each other.

FIG. 15 shows a more comprehensive view of inner frame 30. A first stop aperture 78 and a second stop aperture 82 are present in the inner frame 30, configured to receive a first stop 76 and a second stop 80, respectively (see FIG. 18). While not visible in FIG. 15, second gear 70 may be mounted on the outside of second inner wing 74 in a manner similar to how first gear 68 is mounted to first inner wing 72.

Figure 16:
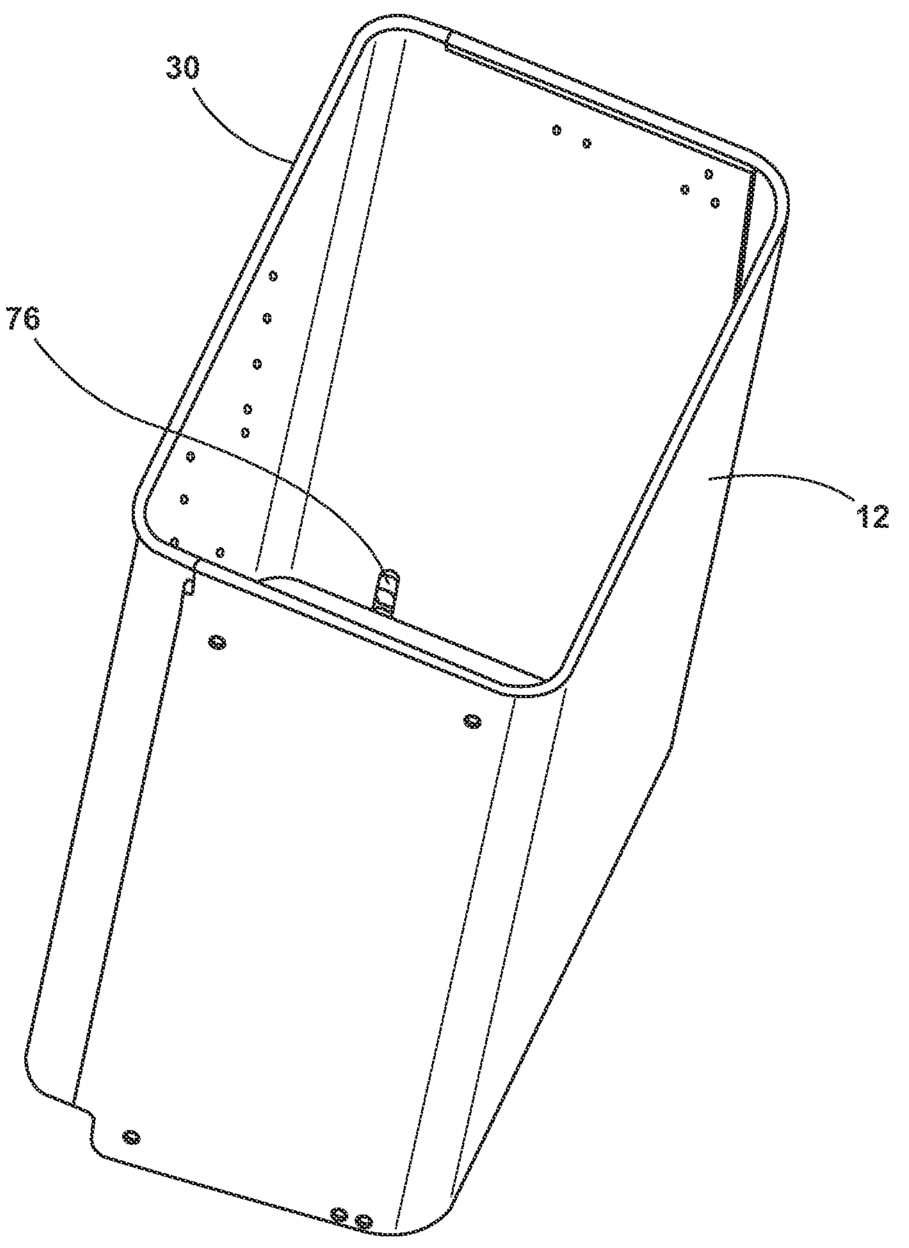
FIG. 16 a view showing the inner and outer frames of the receptacle in a mated position, in an embodiment.
Figure 17:
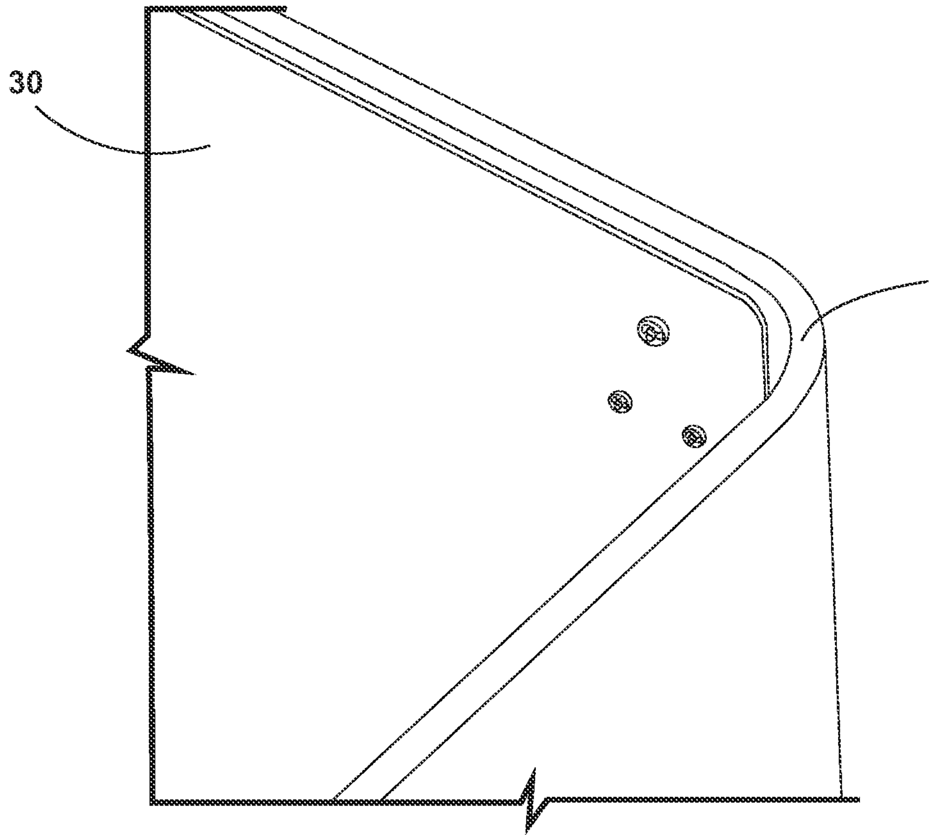
FIG. 17 is a view showing the inner and outer frames mated together, detailing how the first track is secured to the inner frame from the perspective of the inner of the receptacle, in an embodiment.
Figure 18:
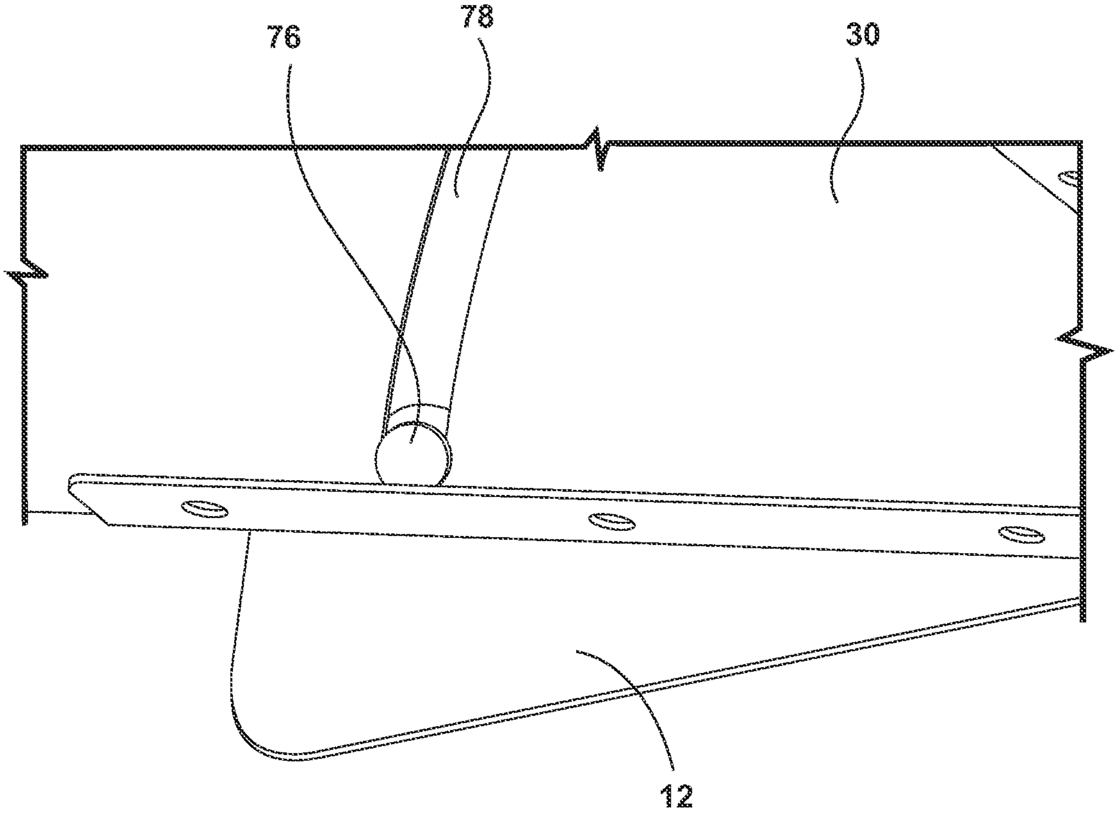
FIG. 18 is a view detailing the first stop mated in the first stop aperture, in an embodiment.

FIG. 16 depicts an embodiment where outer frame 12 and inner frame 30 are in a mated position, wherein the receptacle structure is in a collapsed state. In this embodiment, the first stop 76 is mounted on the outer frame 12 and, when the outer frame 12 and inner frame 30 are in the mated position, mates with the first stop aperture 78 of inner frame 30. FIG. 18 depicts the mated first stop 76 and the first stop aperture 78 in more detail. While not visible in FIG. 16, a second stop 80 is mounted on the outer frame 12 in a position mirroring first stop 76 and mates with the second stop aperture 82 of inner frame 30 in a manner similar as described in relation to first stop 76 and first stop aperture 78. FIG. 17 further demonstrates an embodiment when the outer frame 12 and inner frame 30 are in the mated position.

As previously referenced, FIG. 18 shows an embodiment where the first stop 76 is mounted on the outer frame 12 and is mated with the first stop aperture 78 of inner frame 30. Once the outer frame 12 pivots to a predetermined angle about base hinge 44, first stop 76 meets the end of the first stop aperture 78, preventing outer frame 12 from pivoting beyond the predetermined angle. In an embodiment, travel distance of the first stop 76 will be less than the travel distance of the first gear 68 in the first fixed track 42, so that, when a user engages the base hinge 44 by tilting the outer frame 12, the first stop 76 will meet the end of the first stop aperture 78 before the first gear 68 meets the end of the first fixed track 42 in order to prevent damage to the first gear 68 or the first fixed track 42.

Figure 19:
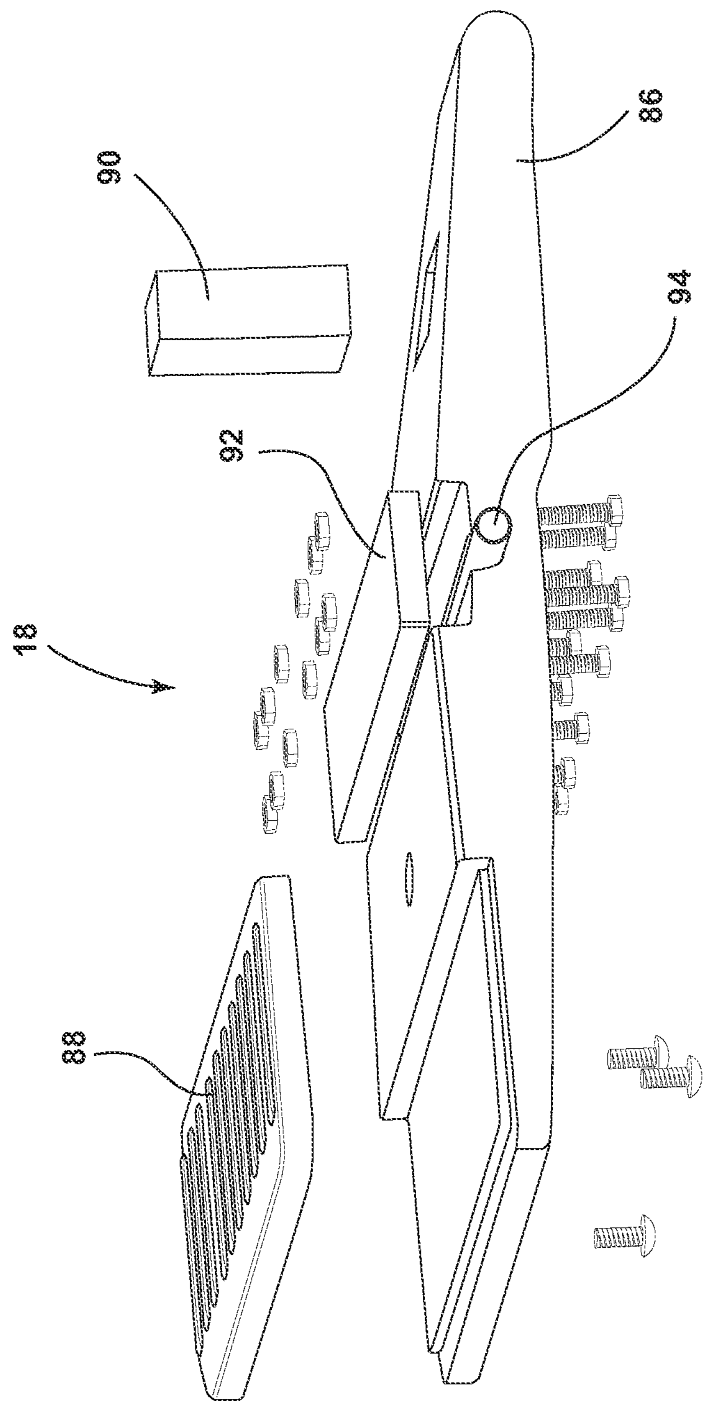
FIG. 19 is an exploded view of the foot pedal assembly, in an embodiment.

The foot pedal assembly 18 is shown in further detail in FIG. 19. In this embodiment, the foot pedal assembly 18 comprises a pedal member 86, the tread 88, a foam member 90, a pivot capture 92 and a pivot rod 94. As shown in FIG. 19, the tread 88 is fixed to the pedal member 86, wherein the pedal member 86 further bears the pivot rod 94 at a position between the tread 88 and the foam member 90. In this embodiment, the pivot rod 94 is set into the pedal member 86 at or near 90 degrees to the vertical length of the pedal member 86, and wherein the pivot rod 94 horizontally extends beyond the pedal member 86. The pivot rod 94 is configured to mate with a first and second pivot rod settings 96 and 98 in the base assembly 14 (shown in FIG. 21). In this embodiment, the pivot capture 92 is fixed over the pivot rod 94 and fixed to the pedal member 86 with screws to hold the pivot rod 94 in place within the pedal member. In an embodiment, a push rod may be abutted to the pedal member 86 at a location distal to the tread 88.

The operation of the embodiment shown in FIG. 19 shall now be described. When a user applies downward mechanical force to the tread 88, the proximate portion of the pedal member 86 moves in the direction of the mechanical force. The pedal member 86 then pivots about the horizontal axis created by the pivot rod 94, forcing the distal end of the pedal member 86 to travel in a direction opposite to the applied force. A push rod may be operatively abutted to the pedal member 86 and may translate the mechanical force along its length to the lid assembly 16.

A push rod may be operatively connected to the pedal member 86 of the foot pedal assembly 18, and at a point distal to the pedal member 86, operatively connected to the lid assembly 16. As further shown in the embodiment of FIG. 2, the back cover 26 is positioned on the back face of the inner frame 30 and covers the push rod in a manner that obscures the same from view without inhibiting their operation.

Figure 20:
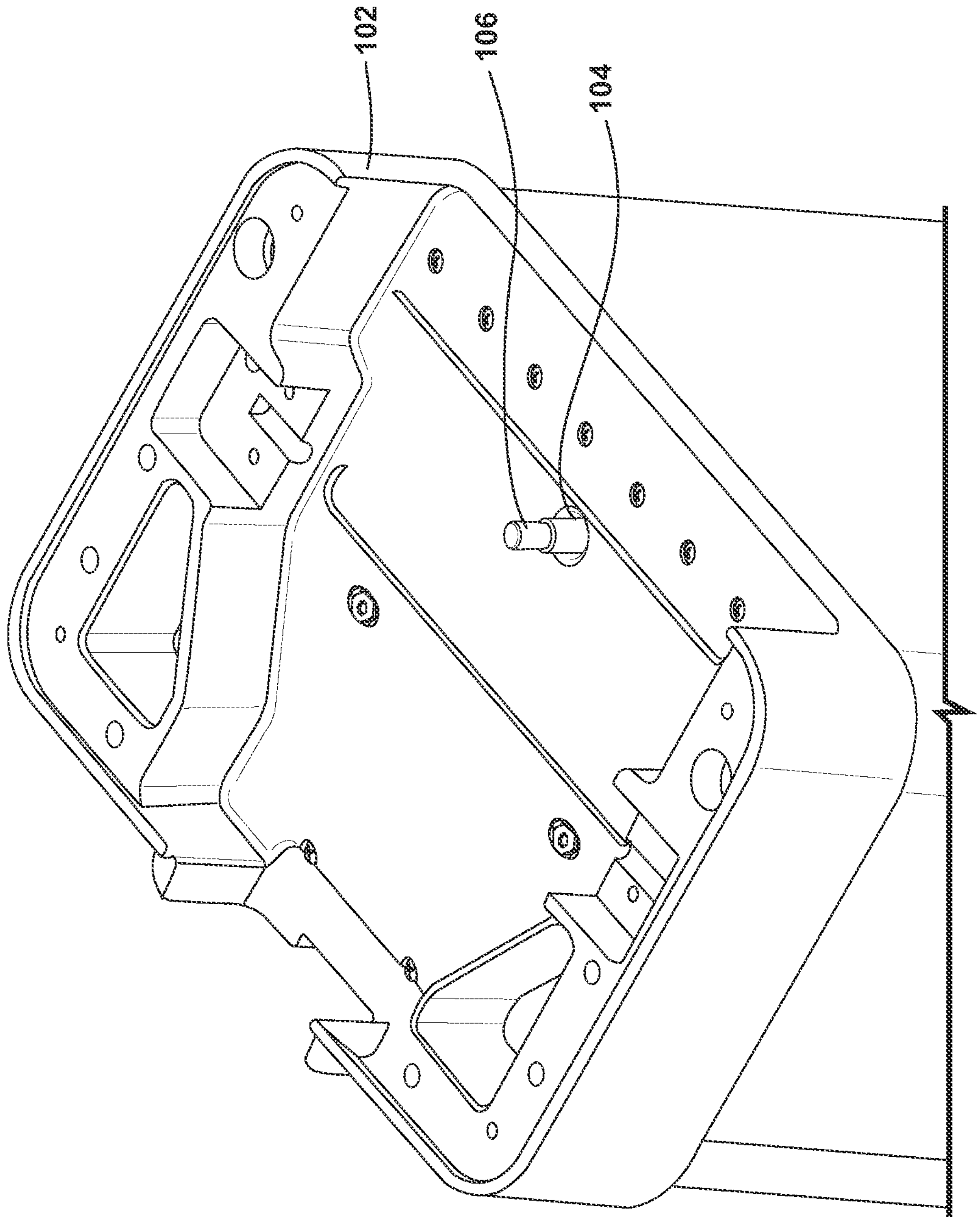
FIG. 20 is an alternative detailed view of the base assembly without the foot pedal assembly mounted, in an embodiment.

FIG. 20 depicts the base assembly 14 comprising a base support structure 102 fixed to the bottom of the receptacle structure, without the foot pedal assembly 18 mounted into the base assembly 14. As further depicted in FIG. 20, the base support structure 102 comprises a dampener aperture 104, whereby a linear dampener 106 extends through and abuts the foot pedal assembly 18.

Figure 21:
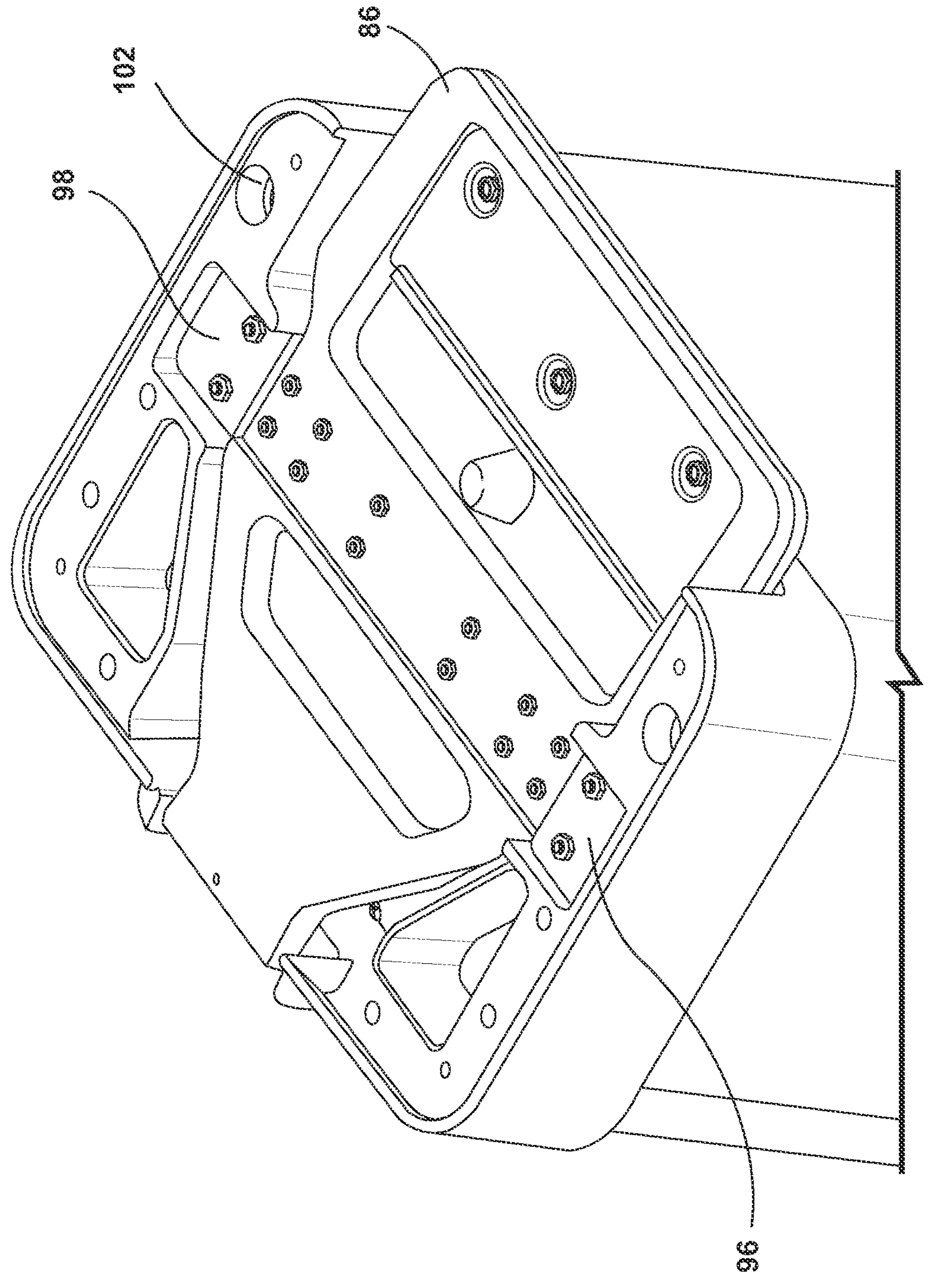
FIG. 21 is an alternative detailed view of the base assembly with the foot pedal assembly mounted, in an embodiment.
Figure 22:
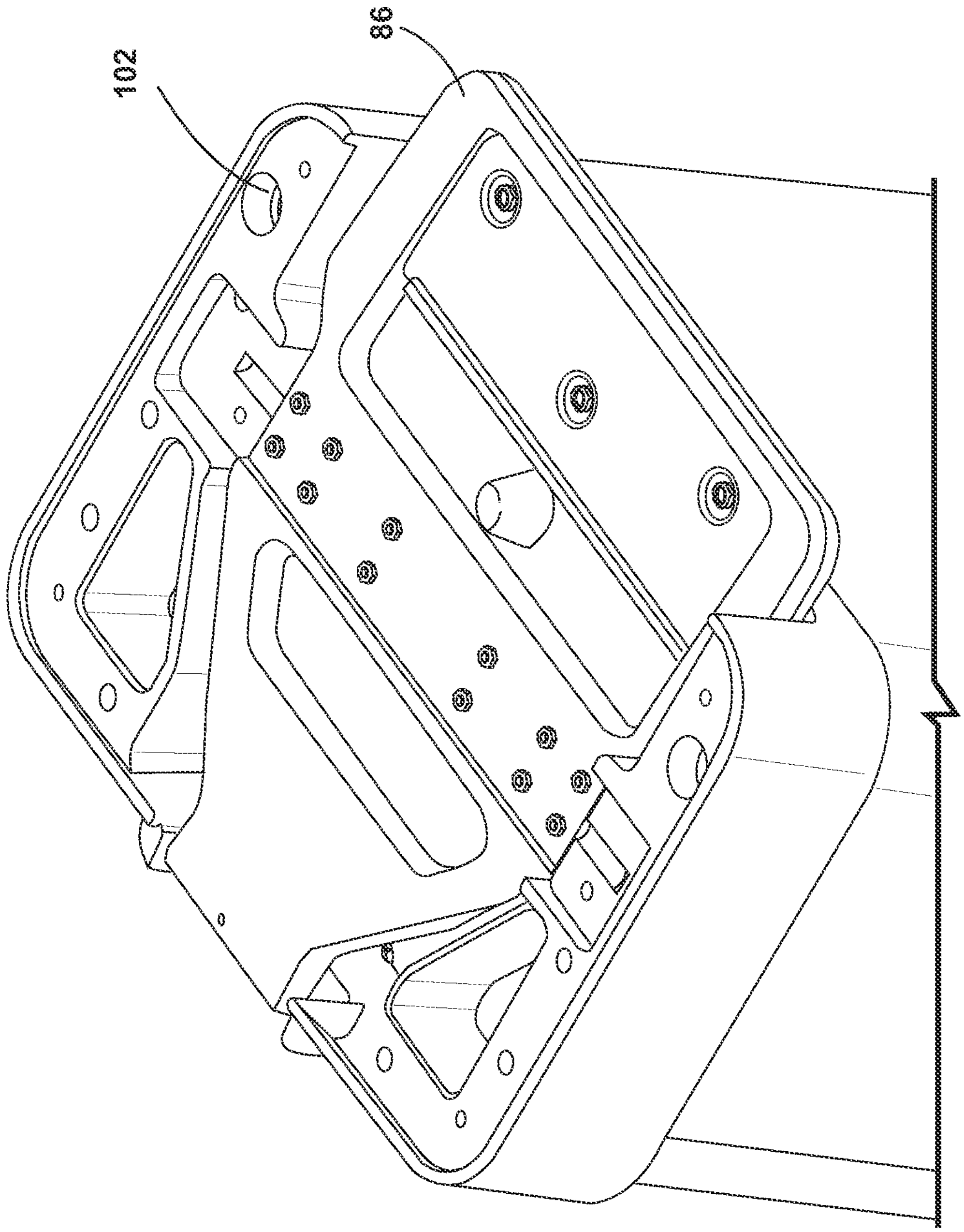
FIG. 22 is an alternative detailed view of the base assembly with the foot pedal assembly mounted, in an embodiment.

FIGS. 21 and 22 depict the foot pedal assembly 18 mounted into the base assembly 14. As detailed in FIG. 21, the locations of the first and second pivot rod settings 96 and 98 within the base assembly 14 can be identified.

Figure 23:
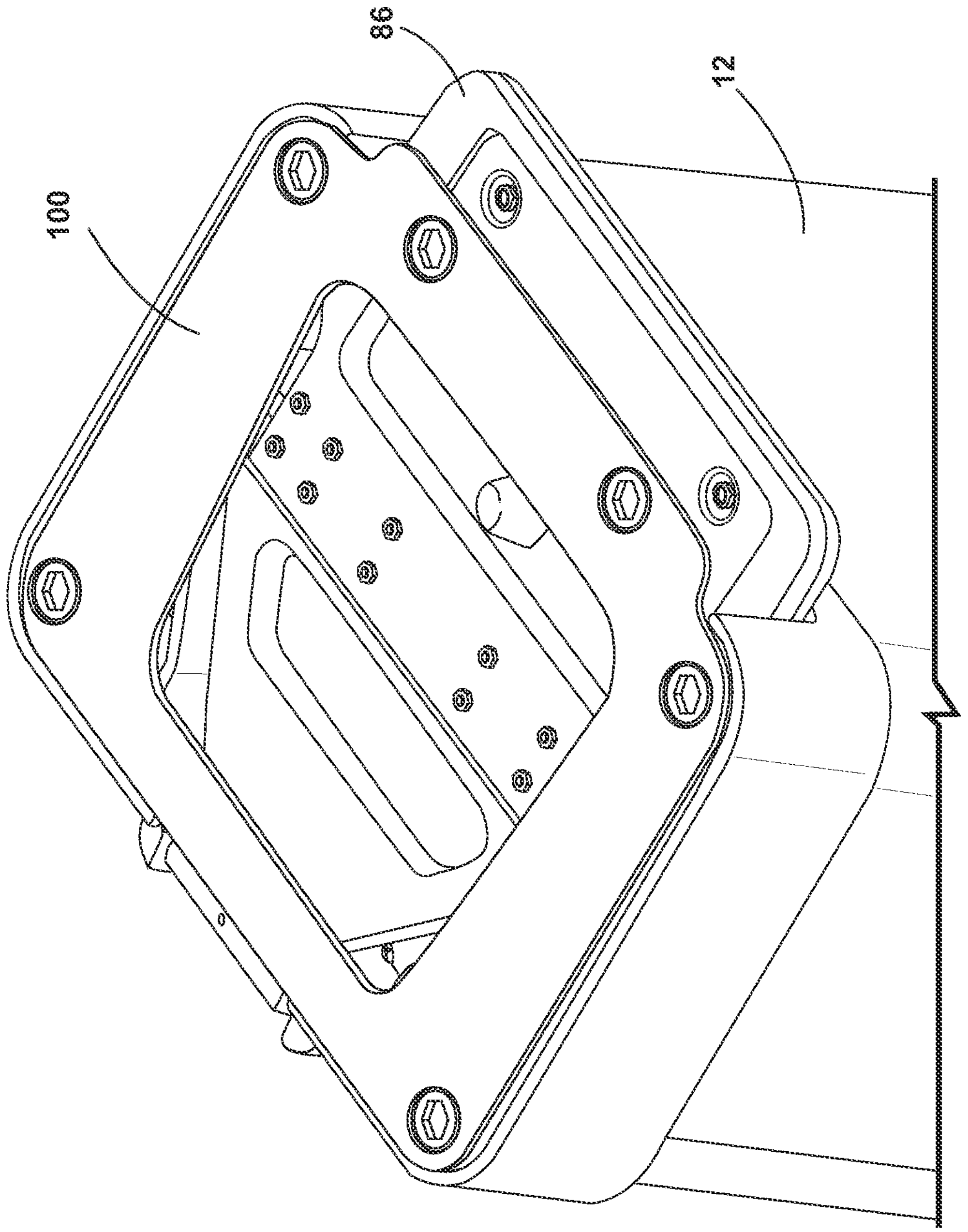
FIG. 23 is an detailed view of the base assembly with the foot pedal assembly mounted and secured by the base plate, in an embodiment.

FIG. 23 depicts the foot pedal assembly 18 mounted into the base assembly 14, with the base plate 100 mounted to secure the foot pedal assembly 18.

Figure 24:
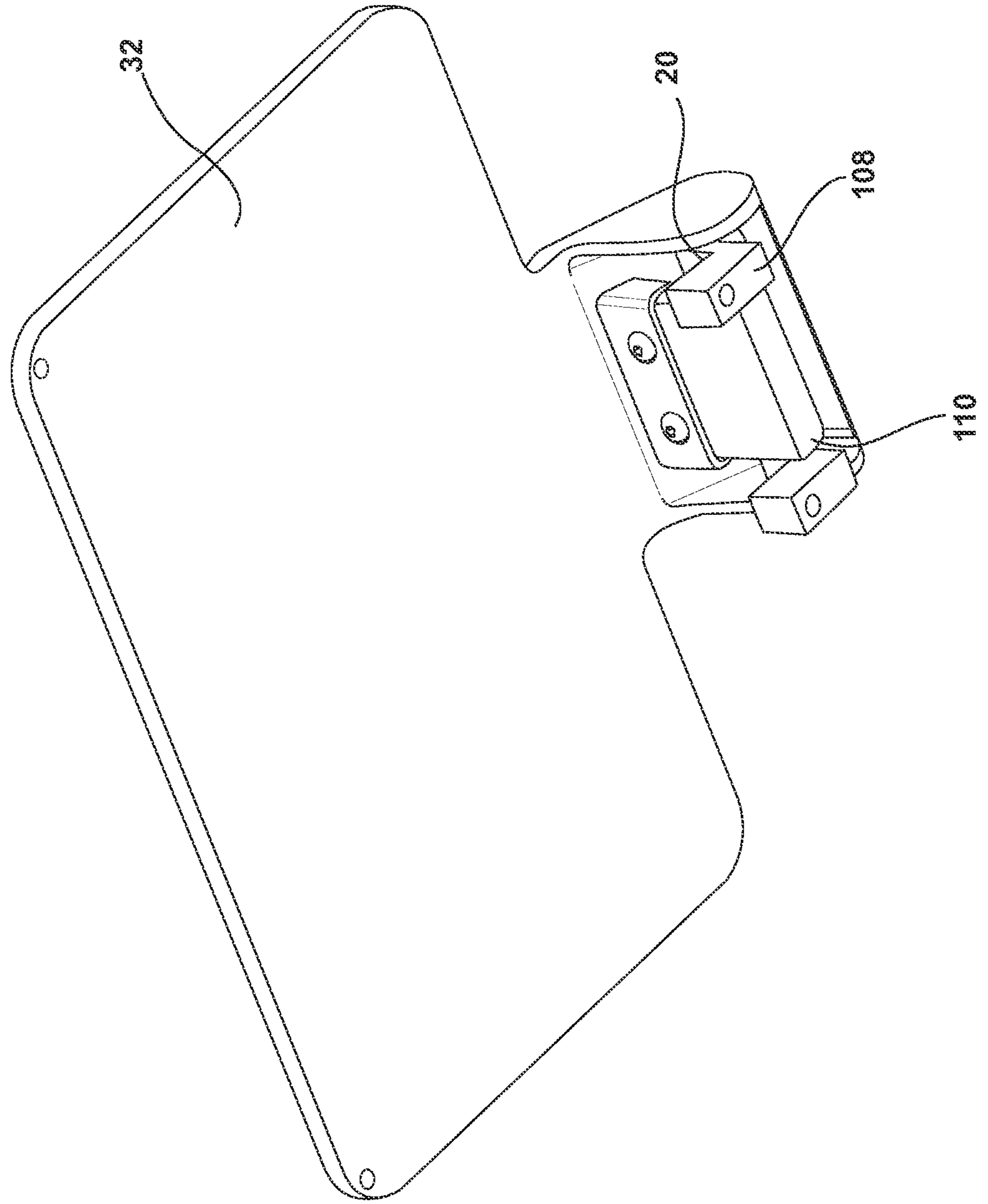
FIG. 24 is a detailed view of the inner lid, in an embodiment.
Figure 25:
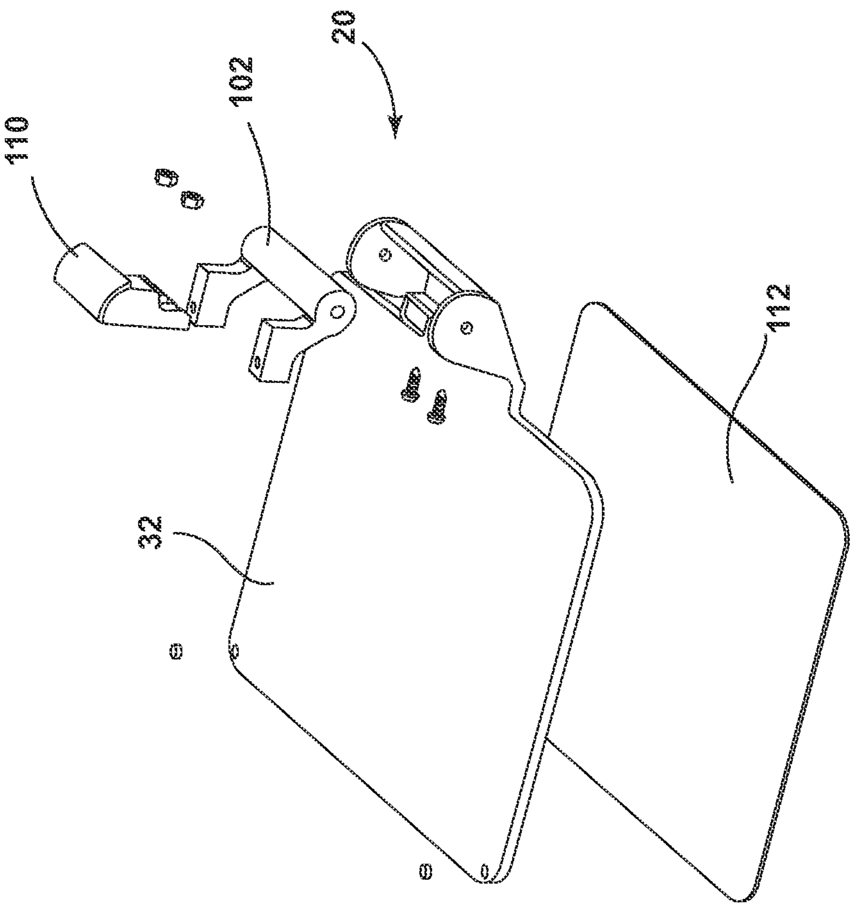
FIG. 25 is an exploded view of the inner lid interacting with the lid hinge, in an embodiment.

The lid assembly 16 shall now be described in greater detail with reference to FIG. 24. As shown in FIG. 24, the inner lid 32 is fixed to the lid hinge 20. The lid assembly 16 is further detailed in FIG. 25, wherein the inner lid 32 is fixed to the lid hinge 20 through screws or other fixing means. In this embodiment, the lid hinge 20 comprises a lid pivot 108 secured into place with a lid cam 110. In a further embodiment, an inner lid cover 112 may be fixed to the inner lid 32 via adhesive means.

Figure 26:
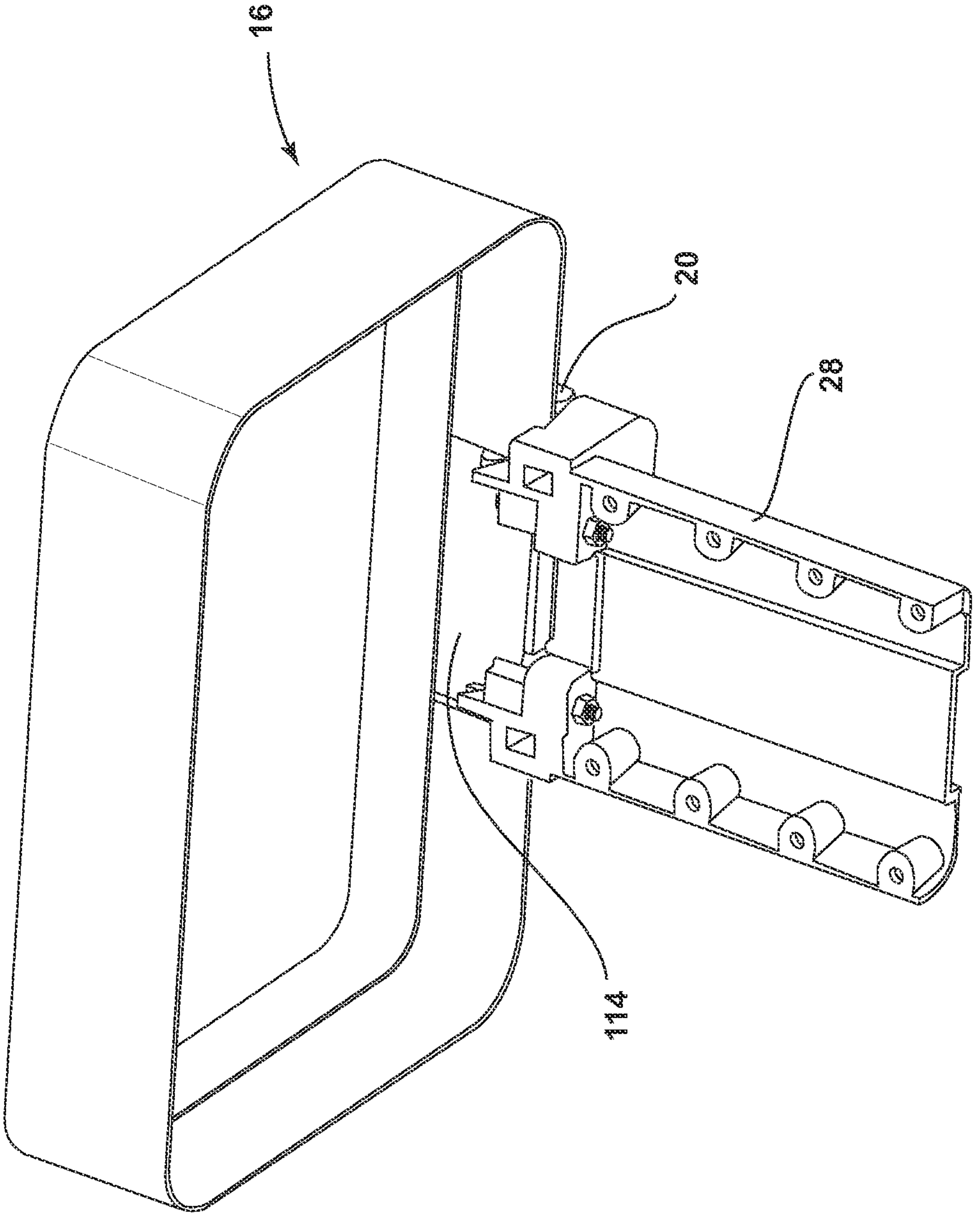
FIG. 26 is a detailed view of the lid assembly connected to the vertical member, in an embodiment.

As depicted in FIG. 26, the vertical member 28 is fixed to the lid assembly 16 at a point below the lid hinge 20 and abutting the lid hinge 20.

Figure 27:
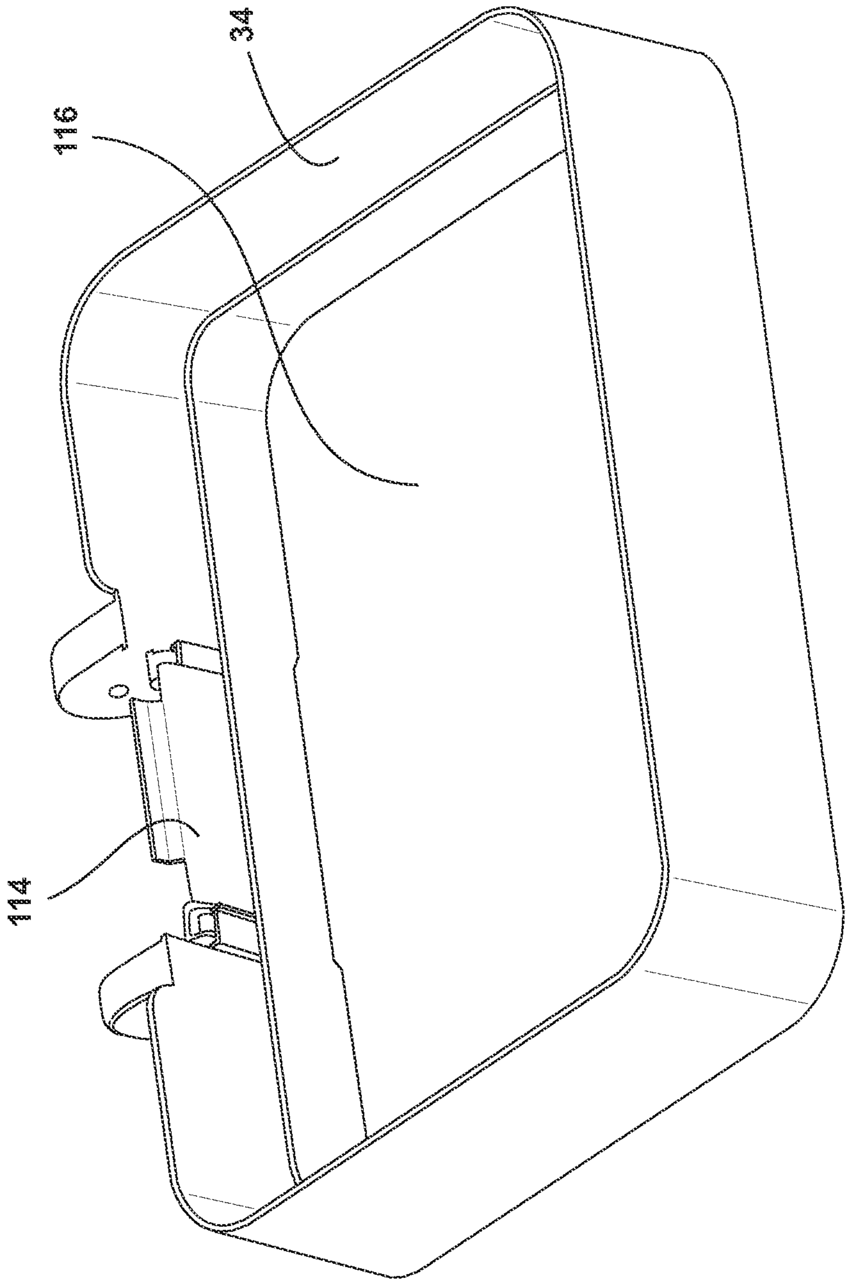
FIG. 27 is a detailed view of a main lid, in an embodiment.

FIG. 27 describes the main lid 34 of the lid assembly 16, in an embodiment. In this embodiment, a bag guard 114 is deployed abutting the lid hinge 20 (not shown) and separating the lid hinge 20 from a receptacle aperture 116 created by the mating of the inner frame 30 and the outer frame 12 and as defined by the structure of the main lid 34.

Figure 28:
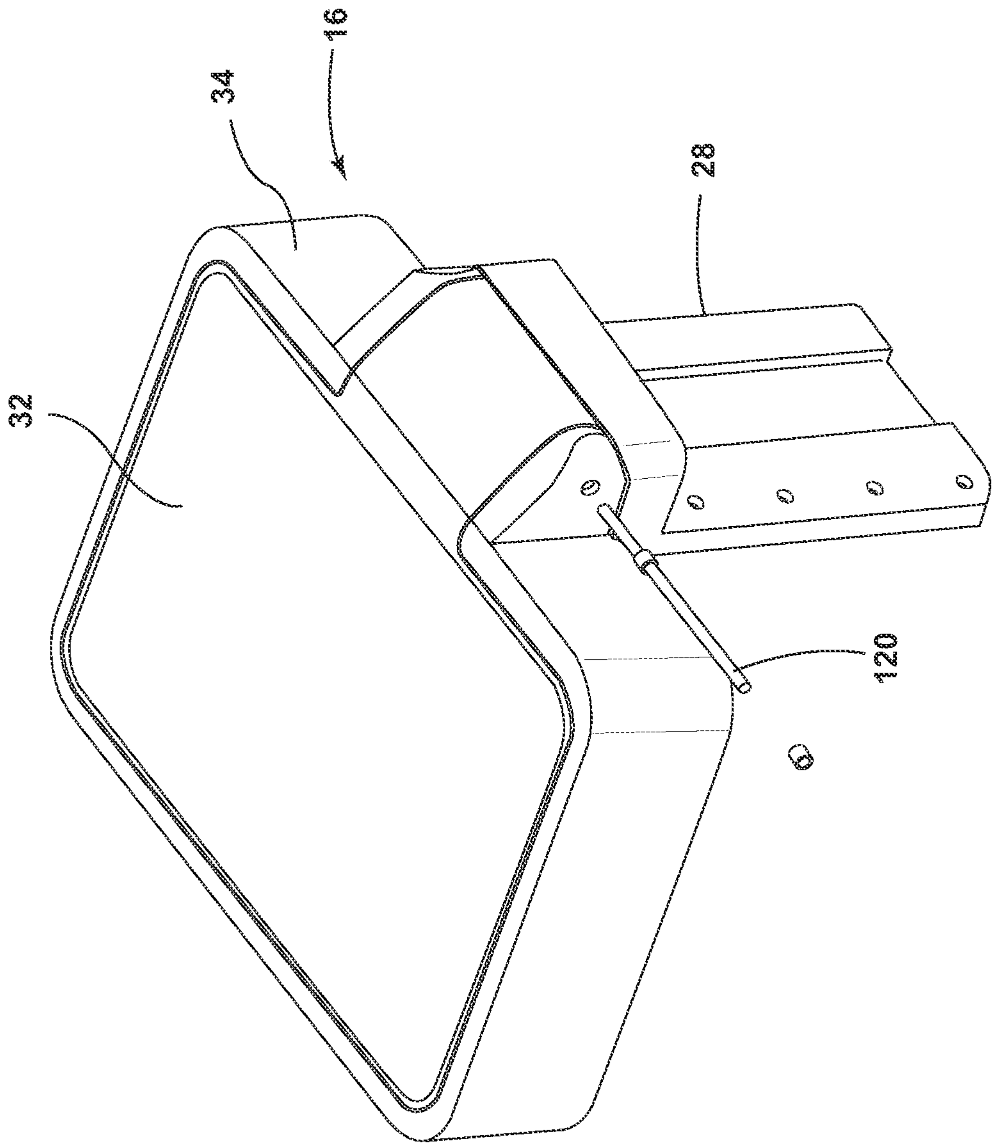
FIG. 28 is an alternative detailed view of the lid assembly connected to the vertical member, in an embodiment.

FIG. 28 depicts the assembled lid assembly 16, in an embodiment. In this embodiment, the inner lid 32 is set into the main lid 34, and when closed, obstructs the receptacle aperture 116. As further shown in FIG. 28, a lid pin may be inserted into the main lid 34 and through the lid hinge 20 to generate a horizontal axis. The lid pin 120 is configured to allow the lid assembly 16 to pivot about the lid hinge 20 and along the horizontal axis created by the lid pin 120.

Figure 29:
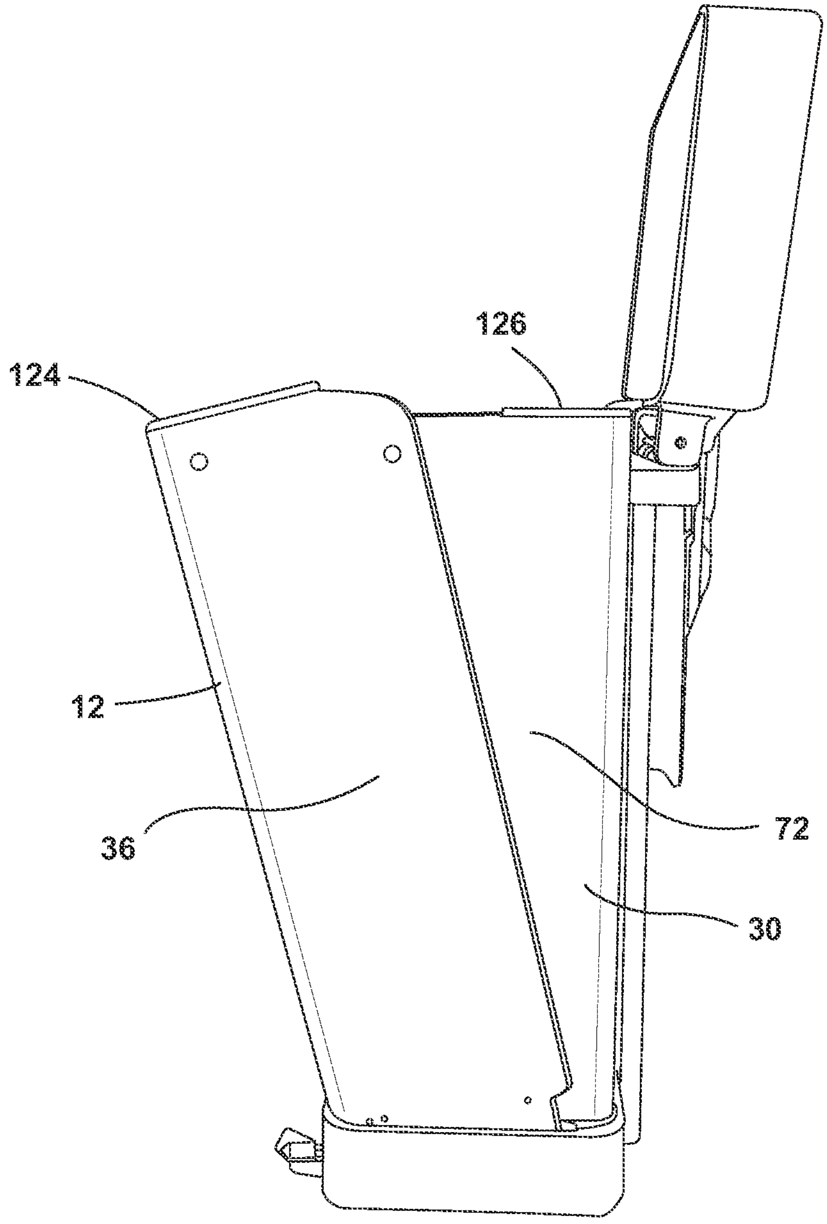
FIG. 29 is a view of the receptacle structure in an expanded state, in an embodiment.

FIG. 29 details an embodiment of the receptacle in its expanded state. As shown, the outer frame 12 has pivoted about the horizontal axis defined by the base hinge 44 until a predetermined angle has been reached and the outer frame 12 is prevented from pivoting further by operation of, in an embodiment, the first stop 76 and the first stop aperture 78. As further seen, the lid assembly 16 has been raised about the lid hinge 20 as to not obstruct the movement of outer frame 12. In the receptacle's expanded state, the interior cavity has a volume defined by the relative positions of the outer frame 12 and inner frame 30. The volume of this cavity has been increased in comparison to volume of the cavity when the receptacle is in its collapsed state, as shown in FIG.

30. In an embodiment, when the cavity volume of the receptacle expands due to the pivoting of outer frame 12 about the horizontal axis defined by the base hinge 44, the surface area defined by the receptacle aperture 116 also expands.

Figure 30:
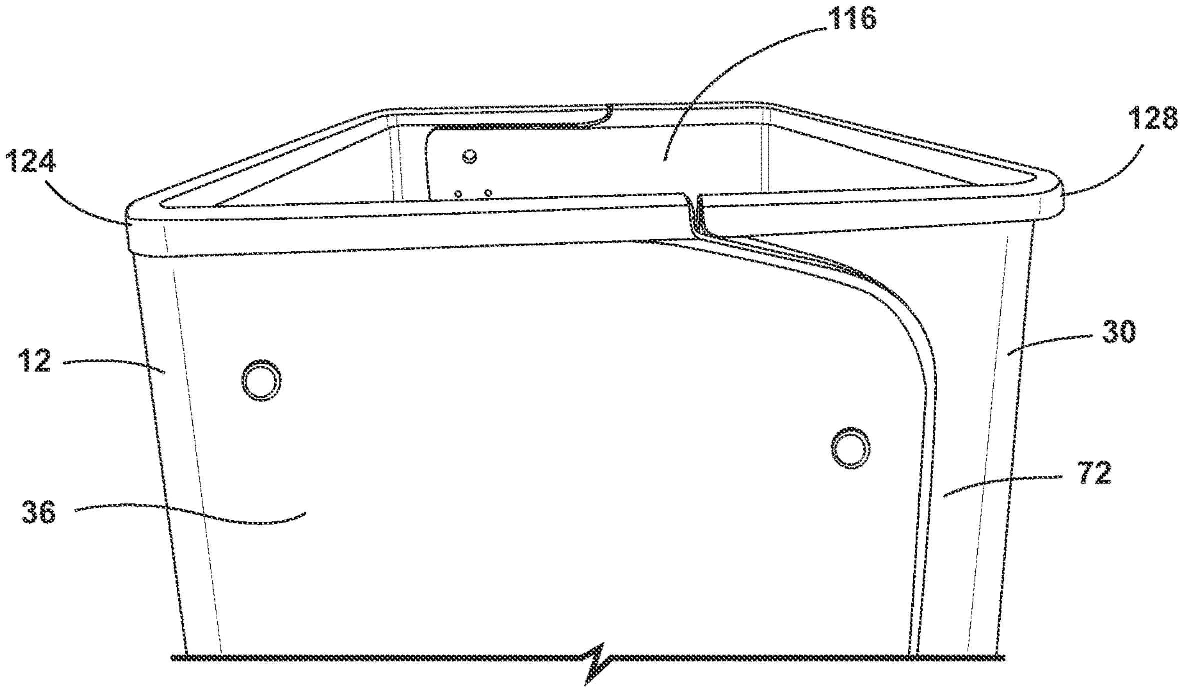
FIG. 30 is a detailed view of the receptacle structure in its collapsed state, in an embodiment.

FIG. 30 shows the receptacle structure in its collapsed state. As shown, when the receptacle is in its collapsed state, both ends of the outer frame lip 124 and the inner frame lip 126 meet and align so that they form a continuous or near-continuous length that covers all or most of the length of receptacle aperture 116.

Figure 31:
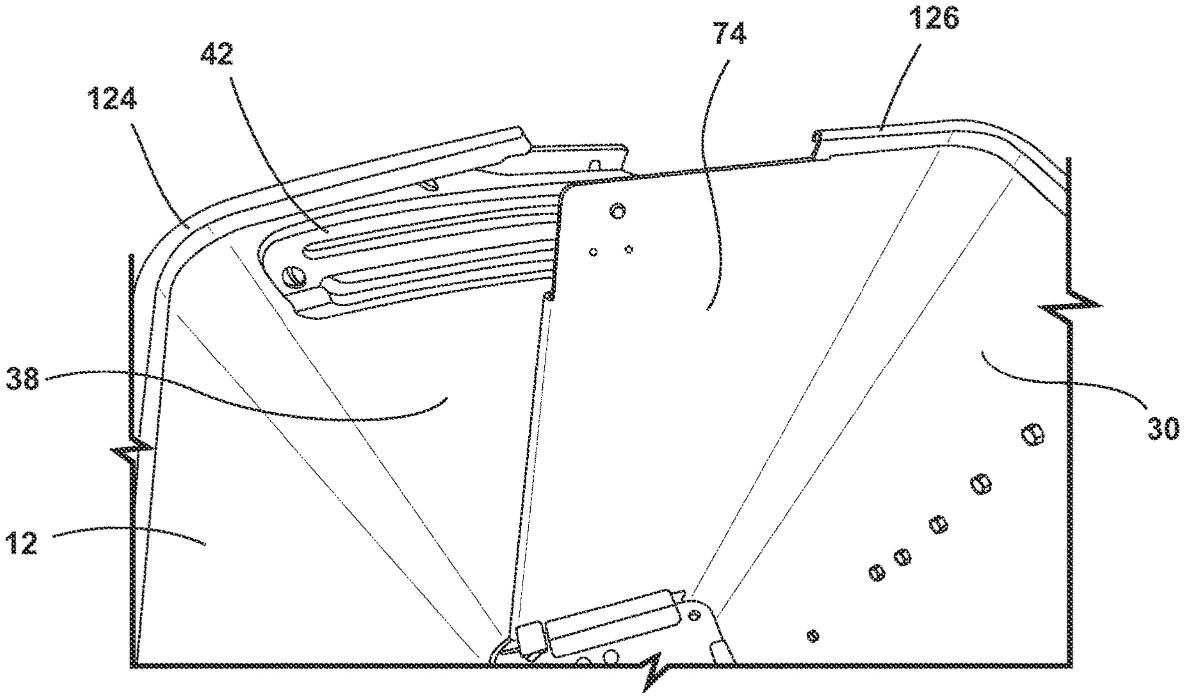
FIG. 31 is a view of the receptacle structure in an alternative embodiment, wherein the second fixed track is visible in an embodiment.
Figure 32:
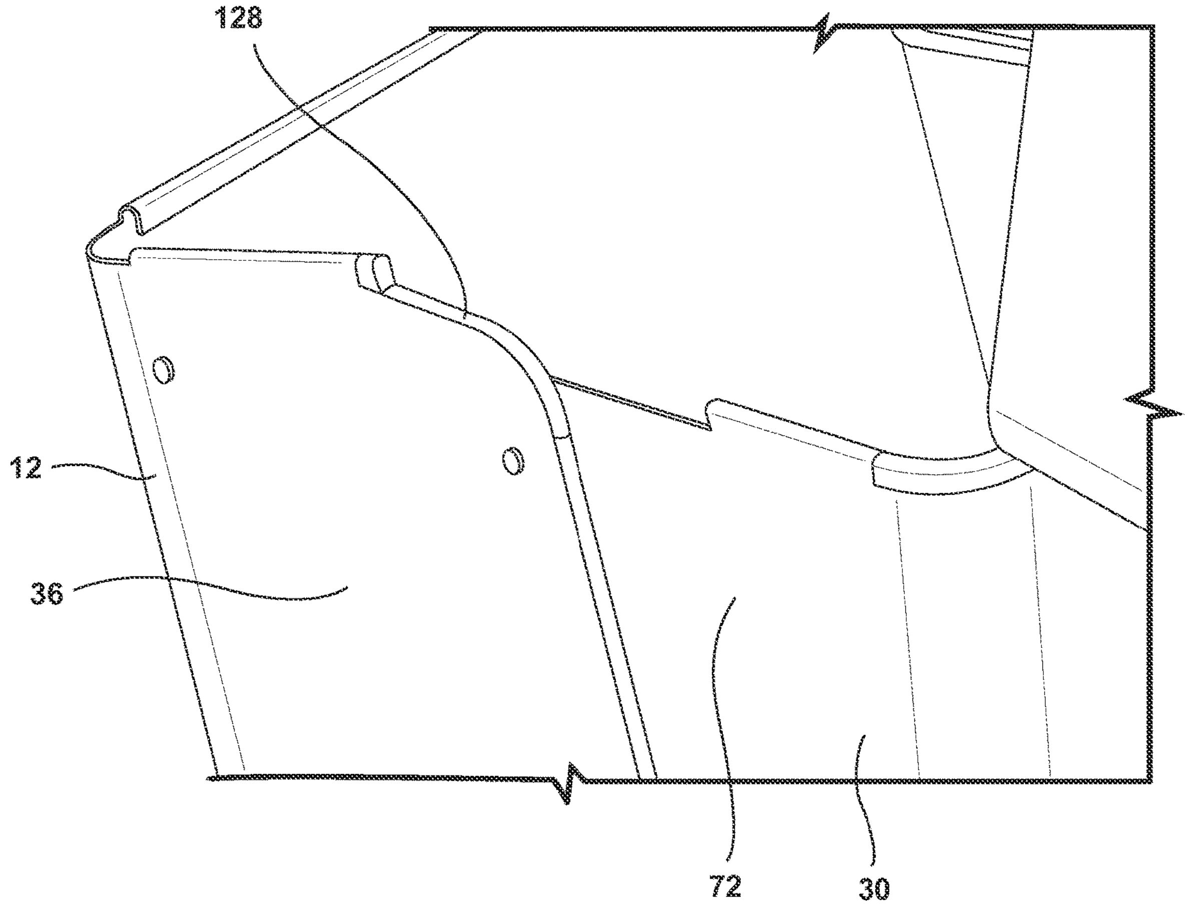
FIG. 32 is a view of the receptacle structure in an alternative embodiment, wherein a first cap is visible covering the convex arc of the first outer wing while the receptacle is in the expanded state.

FIG. 31 details yet another view of an embodiment, where the receptacle structure is in its expanded state. In this embodiment, the second fixed track 42 is seen fixed to the second outer wing 38. Further, the outer frame 12 further comprises an outer frame lip 124 and the inner frame 30 further comprises an inner frame lip 126. As further seen in FIG. 32, the top edges of the first outer wing 36 and second outer wing 38 both taper at one end in a convex arc that is angled toward the bottom of the receptacle structure. The outer frame lip 124 extends as a single member starting from at or near the beginning of the convex arc of the first outer wing 36 and continues along the top edge of the outer frame 12 to at or near the beginning of the convex arc of the second outer wing 38. The inner frame lip 126 extends as a continuous member starting from at or near the mid-point of the first inner wing 72 and continues along the top edge of the inner frame 30 to at or near the mid-point second inner wing 74.

Figure 33:
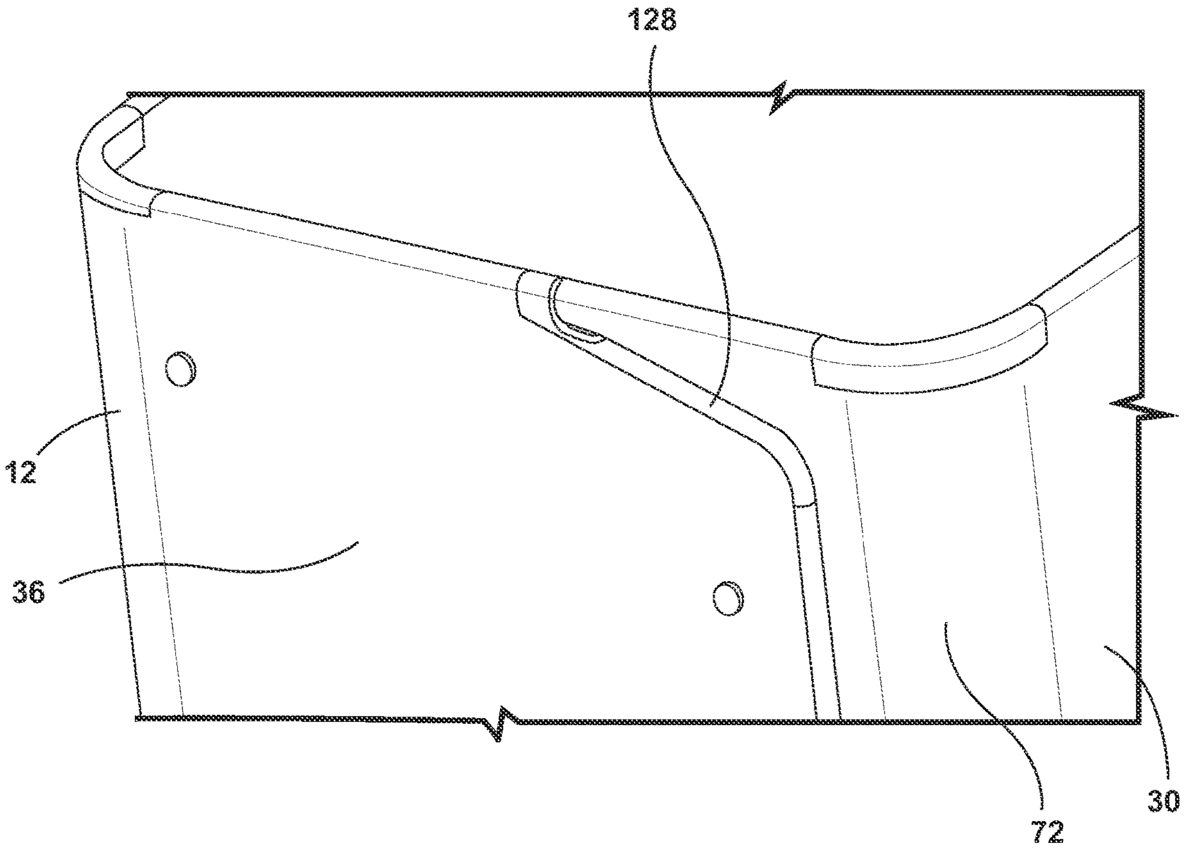
FIG. 33 is an alternative view of the receptacle structure in an alternative embodiment, wherein a first cap is visible covering the convex arc of the first outer wing with the receptable is in the is the expanded state.

The convex arc of the first outer wing 36 and the second outer wing 38 is protected via a first cap 128 and a second cap 130 (not shown), respectively. The first cap 128 and second cap 130 cover the exposed structure of the outer frame 12. An alternative view of the embodiment may be seen in FIG. 33, wherein the receptacle structure comprising the first cap 128 and second cap 130 is in its collapsed state.

What is claimed is:

1. A receptacle comprising:

a first frame;

a second frame adjoining the first frame to define a cavity with a first volume;

a hinge, defining a first axis and operatively attached to the first frame, wherein the first frame may pivot about the first axis in order to redefine the cavity with a second volume; and a gear member comprising a first plurality of teeth disposed on an exterior surface of the second frame mated with a track comprising a second plurality of teeth disposed on an interior surface of the first frame, wherein the gear member and the track are configured to mate and permit lateral movement between the first frame and the second frame in order to redefine the cavity with the second volume, and further wherein when the gear member and the track are mated, the gear member is completely concealed between the first frame and the second frame when the receptacle is in a collapsed state.

2. The receptacle of claim 1, wherein the receptacle further comprises a lid assembly, wherein the lid assembly abuts the cavity with the first volume and covers an aperture defined by the cavity with the first volume.

3. The receptacle of claim 2, wherein the lid assembly further comprises:

an outer lid;

an inner lid seated within the outer lid; and a lid hinge, defining a second axis and operatively attached to the outer and inner lid, wherein each of the outer lid and the inner lid may pivot about the second axis defined by the lid hinge independently of each other.

4. The receptacle of claim 3, wherein the receptacle further comprises a foot pedal assembly.

5. The receptacle of claim 4, wherein the foot pedal assembly further comprises:

a foot pedal member; and a pivot rod defining a third axis disposed within the foot pedal assembly between the foot pedal member and a push rod operatively abutted to the foot pedal member and the lid assembly.

6. The receptacle of claim 1, wherein the first frame further comprises a stop, wherein the stop is mated with a stop aperture disposed within the second frame.

7. The receptacle of claim 1, wherein the receptacle further comprises a spring connecting the first frame to the second frame and configured to resist the first frame's pivot about the first axis.

* * * * *